(12) United States Patent
Kayanuma

(10) Patent No.: US 7,738,326 B2
(45) Date of Patent: Jun. 15, 2010

(54) SIGNAL PROCESSING METHOD OF WOBBLE SIGNAL, RECORDING AND REPRODUCING METHOD OF OPTICAL DISC, OPTICAL DISC APPARATUS, PROGRAM, AND RECORDING MEDIUM

(75) Inventor: Kinji Kayanuma, Tokyo (JP)

(73) Assignee: NEC Corporation, Tokyo (JP)

(*) Notice: Subject to any disclaimer, the term of this patent is extended or adjusted under 35 U.S.C. 154(b) by 417 days.

(21) Appl. No.: 11/911,261

(22) PCT Filed: Apr. 13, 2006

(86) PCT No.: PCT/JP2006/307806

§ 371 (c)(1),
(2), (4) Date: Oct. 11, 2007

(87) PCT Pub. No.: WO2006/112342

PCT Pub. Date: Oct. 26, 2006

(65) Prior Publication Data

US 2009/0073822 A1 Mar. 19, 2009

(30) Foreign Application Priority Data

Apr. 13, 2005 (JP) ............................. 2005-115269

(51) Int. Cl.
*G11B 7/00* (2006.01)
(52) U.S. Cl. ............................... 369/44.13; 369/47.17
(58) Field of Classification Search ...................... None
See application file for complete search history.

(56) References Cited

U.S. PATENT DOCUMENTS 7,342,864 B2 * 3/2008 Nagai et al. .............. 369/59.26
7,599,262 B2 * 10/2009 Mashimo ................. 369/47.19
2002/0018411 A1 2/2002 Kumagai
2002/0141307 A1 * 10/2002 Kuribayashi et al. ...... 369/47.17
2003/0067858 A1 * 4/2003 Kuroda et al. ............ 369/59.24

FOREIGN PATENT DOCUMENTS

JP 2001-034977 2/2001

(Continued)

OTHER PUBLICATIONS

International Search Report of PCT/JP2006/307806, date of mailing Aug. 1, 2006.

*Primary Examiner*—Joseph H Feild
*Assistant Examiner*—Joseph Haley
(74) *Attorney, Agent, or Firm*—Young & Thompson

(57) ABSTRACT

In a method of and an apparatus for creating a reproduced wobble signal by subtracting an estimated crosstalk signal, expressed by a sine waveform having a frequency approximately equal to the meandering frequency of grooves, from an original wobble signal and recording or reproducing an information pattern at a predetermined position of an optical disc, a carrier signal, which is caused to correspond to the meandering of the groove by being subjected to phase synchronization, is assumed based on the reproduced wobble signal, a crosstalk remaining component is estimated from the amplitude and phase of the region, which meanders in approximately the same phase as the estimated carrier signal in the reproduced wobble signal, and from the amplitude and phase of the region which meanders according to a signal different from the estimated carrier signal, and the estimated crosstalk is updated to cancel the remaining component.

21 Claims, 14 Drawing Sheets

FOREIGN PATENT DOCUMENTS

| | | |
|---|---|---|
| JP | 2001-209937 | 8/2001 |
| JP | 2001-338421 | 12/2001 |
| JP | 2002-269753 | 9/2002 |
| JP | 2003-051121 | 2/2003 |
| JP | 2004-134009 | 4/2004 |
| JP | 2004-310958 | 11/2004 |
| JP | 2004-318939 | 11/2004 |
| JP | 2005-018898 | 1/2005 |
| JP | 2005-025801 | 1/2005 |
| JP | 2006-024295 | 1/2006 |

* cited by examiner

SIGNAL PROCESSING METHOD OF WOBBLE SIGNAL, RECORDING AND REPRODUCING METHOD OF OPTICAL DISC, OPTICAL DISC APPARATUS, PROGRAM, AND RECORDING MEDIUM

FIELD OF THE INVENTION

The present invention relates to a signal processing method of a wobble signal, a recording and reproducing method of an optical disc, an optical apparatus, a program, and a recording medium. The wobble signal is used when, in an optical disc having tracks formed thereon to record information spirally, an information pattern is recorded at a predetermined position on the track or an information pattern recorded at a predetermined position on the track is reproduced.

BACKGROUND ART

A recording type DVD (Digital Versatile Disc) has become widespread as a large capacity optical disc. In the recording type DVD, spiral grooves are engraved on the recording surface of a disc as tracks for recording an information pattern. In a DVD-R disc, the grooves are formed to slightly meander according to a carrier signal composed of a sine wave. In a recording and reproducing apparatus for DVD, a light beam emitted from an optical head is positionally controlled so as to converge on a groove acting as a recording track. Further, the number of rotation of an optical disc is controlled such that a light beam carries out scanning on a recording track at a predetermined linear speed. To control the rotation of the optical disc easily, a carrier signal reproduced from the meandering of a track is used. Since the grooves meander at a predetermined space frequency, the linear speed can be kept constant by controlling the number of rotation so that the frequency of a reproduced carrier signal is made constant. When the linear speed is kept constant, an information pattern which is recorded in synchronization with a recording clock kept to a predetermined frequency is formed on grooves as patterns having a predetermined line density.

In the DVD-R disc, digital information including address information is represented by prepits disposed between grooves as emboss pattern. The prepits are disposed in addition to the meandering of the grooves. When data is recorded to a particular address on a disc, a recording start position is controlled by decoding the information of the prepits.

An address information showing a position on a disc can be represented by a method of modulating the meandering phase of grooves as in DVD+R, in place of a method of representing it using prepits as in DVD-R. In the DVD+R, a signal, which is caused to represent digital information including address by inserting a sine wave whose phase is locally different 180° from a sine wave carrier signal into the carrier signal, is used as a wobble signal, and grooves are meandered according to the signal. Address information can be obtained by decoding a reproduced wobble signal.

A recording and reproducing method of related art and the functions of the respective blocks in an optical disc apparatus will be explained below based on a block diagram of an optical disc apparatus shown in FIG. 13.

A light beam emitted from an optical head 2 is converged on an optical disc 1, and the light reflected therefrom is received by a photodetector (not shown in FIG. 13) divided into two portions in a direction along a groove. A signal which changes along the meandering of the groove can be obtained by calculating the difference of current outputs obtained from respective detectors by a regenerative amplifier 3. However, the light beam converged on the optical disc 1 also partly covers adjacent grooves in addition to a target groove.

FIG. 14 conceptually shows the grooves on the optical disc and a light beam converged thereon. A light beam 201 emitted from the optical head 2 is converged on the optical disc 1, and although the greater part of the components of the light beam 201 intensively distribute within an circle shown by a dotted line, a part of the component also distribute to the outside of circle. Accordingly, a part of the reflected light includes the light in the vicinity of the circle. The original wobble signal obtained from the regenerative amplifier 3 is a signal in which a crosstalk component and noise corresponding to the meandering of the adjacent grooves are mixed. However, conventionally, the crosstalk and noise are treated as a disturbance, and a wobble clock synchronized with the original wobble signal is obtained by a wobble clock extraction circuit 6 based on the output from the regenerative amplifier. A circuit such as a PLL (Phase Locked Loop) synchronization circuit provided with a high frequency stability by absorbing a phase variation due to noise is used as the wobble clock extraction circuit 6.

The address information is extracted by using a wobble signal decoding circuit 5 on the basis of the original wobble signal and wobble clock. The wobble signal decoding circuit 5 includes, for example, a band-pass filter 501, a sampling circuit 502, a synchronization circuit 503, and an address decoder 504. The band-pass filter 501 has a pass band in the vicinity of wobble frequency and removes an out-of-band noise component from the original wobble signal, the sampling circuit 502 samples the output from the band-pass filter in synchronism with the wobble clock, the synchronization circuit 503 binarizes and synchronizes the output from the sampling circuit 502, and the address decoder 504 decodes the output from the synchronization circuit 503 and extracts the address information.

When the number of rotation of a spindle motor 13 is controlled using a spindle control circuit 12 so that the frequency of the wobble clock obtained by the wobble clock extraction circuit 6 is made constant, the scanning speed of a light beam is kept to an approximately constant linear speed. A disc system control circuit 10 creates a record pattern in synchronism with a recording clock kept to a predetermined frequency on the basis of the address information obtained from the wobble signal decoding circuit 5, and the intensity of the light beam is modified through a recording control circuit 11, thereby an information pattern can be formed on the optical disc 1 at a predetermined line density.

Further, the disc system control circuit 10 detects the total amount of the light reflected from the optical disc 1 by the current output of the photodetector output from the optical head 2 through a regenerating (reproducing) control circuit 16 on the basis of the address information obtained from the wobble signal decoding circuit 5 and reads the information pattern on the optical disc 1.

A clock synchronized with the wobble clock may be created and used by a multiplying circuit (integral multiplication circuit) in place of using an oscillator having a fixed frequency, as a recording clock creation (generation) circuit. Although the oscillator having the fixed frequency is excellent in a frequency stability, it does not follow to the variation of the linear speed caused by the decentering of the optical disc. Accordingly, it is difficult for the oscillator to suppress the accuracy of an information pattern forming position to equal to or less than an amount of phase variation. In contrast, when a recording clock is created by integral multiplication of the wobble clock, since an information pattern can be recorded following to the linear speed detected from the wobble frequency, a high positioning accuracy can be obtained.

When grooves meander at a predetermined space frequency as in DVD-R and DVD+R, phases of the meandering do not match with each other in grooves adjacent to each other and are gradually dislocated. Accordingly, the variations of the amplitude and phase of a frequency corresponding to the difference between the meandering frequency of the groove corresponding to a track to be processed and the meandering frequency of grooves adjacent to the groove appear to the original wobble signal with which a crosstalk is mixed. When it is intended to directly extract a wobble clock from an original wobble signal by using the PLL as in the example of the related art, phase dislocation also appears in a reproduced wobble clock due to a crosstalk.

When it is necessary to produce information including an address by decoding the meandering phase of grooves as in DVD+R, a problem arises in that a decoding error is liable to occur because the phase of a wobble clock which must act as a phase determination standard is dislocated.

Patent Document 1 discloses an example of a decoding apparatus for stably reproducing an address even if a wobble signal is deformed by a crosstalk component and the like.

Patent Document 1: Japanese Patent Application Laid-Open Publication No. 2004-134009 (paragraph Nos. [0034], [0035], FIG. 8)

DISCLOSURE OF THE INVENTION

However, even in the apparatus disclosed in Patent Document 1, since a wobble clock extraction circuit uses an original wobble signal including a crosstalk to extract a carrier signal, phase dislocation caused by the crosstalk appears in a carrier signal itself. Since the phase dislocation cannot be compensated in the apparatus disclosed in the example, it is difficult to secure a positioning accuracy by the extracted carrier signal. Further, the apparatus employs a method of correcting the distortion, which occurs to the output of a synchronization detection circuit composed of a multiplier due to the phase dislocation, afterward by determining a pattern based on the sequence of cumulated values at each predetermined section. However, it is difficult for the method to avoid a determination error when a large crosstalk occurs, and thus address information cannot be stably obtained.

That is, the variations of the amplitude and phase corresponding to the difference between the meandering frequency of the groove corresponding to the track to be processed and the meandering frequency of the grooves adjacent to the groove appears to the original wobble signal with which the crosstalk is mixed. When it is intended to directly extract the wobble clock from the original wobble signal by using the PLL, phase dislocation also appears to a reproduced wobble clock due to a crosstalk. Further, when it is necessary to obtain information including an address by decoding the meandering phase of the groove, a problem arises in that a decoding error is liable to occur because the phase of the wobble clock acting as the phase determination standard is dislocated.

To solve the above problems, a wobble signal processing method, an optical disc recording and reproducing method, an optical disc apparatus, a program, and a recording medium according to the present invention employ the following characteristic arrangements.

That is, in a wobble signal processing method of the present invention used when a light beam is irradiated onto a tracks of an optical disc, which has tracks formed thereon to record information spirally, formed such that the track meanders according to a wobble signal modulated to express digital information including address information by locally inserting a signal, which is different from an approximately sine wave carrier signal having a predetermined frequency, into the carrier signal according to a predetermined pattern, an original wobble signal, which includes a component corresponding to the meandering of the track and a crosstalk component caused by the meandering of adjacent tracks, is created from reflected light, address information and timing are detected based on the original wobble signal, and an information pattern is recorded on the tracks or an information pattern on the tracks is reproduced, the wobble signal processing method includes a step of estimating the amplitude and phase of a crosstalk component mixed from the adjacent tracks based on the amplitude and phase of the original wobble signal created in a region in which the track meanders according to the carrier signal and on the amplitude and phase of the original wobble signal created in a region in which the track meanders according to the inserted signal, a step of obtaining a reproduced wobble signal for obtaining the estimated value of the carrier signal and the address information by subtracting the estimated value of the crosstalk component from the original wobble signal, and a step of detecting the address information and the timing from the reproduced wobble signal.

Further, a wobble signal processing method of the present invention includes a step of creating an original wobble signal which changes according to the meandering of one groove formed to an optical disc based on the difference of current outputs obtained from a photodetector divided into two portions in a direction along the one groove, a step of outputting a correction signal whose crosstalk component is reduced based on an original wobble signal including the crosstalk and a estimated crosstalk component from estimated adjacent tracks, a step of extracting a wobble clock, which is synchronized with the correction signal from the correction signal, a step of extracting a carrier component which agrees with the phase of the wobble clock from the correction signal based on the phase of the wobble clock, a step of extracting a modulation component from the correction signal based on the phase of the wobble clock, a step of creating the estimated crosstalk component based on the carrier component and on the modulation component, and a step of creating an address signal by decoding a wobble signal from the correction signal.

In an optical disc apparatus of the present invention for recording an information pattern on a track or reproducing an information pattern on a track by using an optical disc, which has tracks formed thereon to record information spirally, formed such that the track meanders according to a wobble signal modulated to express digital information including address information by locally inserting a signal, which is different from an approximately sine wave carrier signal having a predetermined frequency, into the carrier signal according to a predetermined pattern, the optical disc apparatus includes a original wobble signal reproducing means for irradiating a light beam onto the track and creating an original wobble signal including a component corresponding to the meandering of the track and a crosstalk component caused by the meandering of adjacent tracks from reflected light, a crosstalk estimation means for creating the estimated value of a crosstalk component estimated based on the original wobble signal, a crosstalk correction means for obtaining a reproduced wobble signal by subtracting the estimated value of the crosstalk component from the original wobble signal, and a wobble signal decoding means for detecting digital information including the address information based on the reproduced wobble signal whose crosstalk component is corrected, wherein an information pattern is recorded on the track or an information pattern on the track is reproduced based on the address information and timing detected by the wobble signal decoding means.

An optical disc apparatus of the present invention includes a regenerative amplifier for outputting an original wobble signal which changes according to the meandering of one groove formed to an optical disc based on the difference of current outputs obtained from a photodetector divided into two portions in a direction along the one groove, a crosstalk correction circuit for outputting a correction signal whose crosstalk component is reduced based on an output including the crosstalk of the regenerative amplifier and on a estimated crosstalk component from estimated adjacent tracks, a wobble clock extraction circuit for extracting a wobble clock, which is synchronized with the correction signal from the crosstalk correction circuit, from the correction signal, a carrier component extraction circuit for extracting a carrier component, which agrees with the phase of the wobble clock, from the correction signal of the crosstalk correction circuit based on the phase of the wobble clock, a modulation component extraction circuit for extracting a modulation component from the output of the crosstalk correction circuit based on the phase of the wobble clock, a crosstalk estimation circuit for outputting the estimated crosstalk based on the outputs from the carrier component extraction circuit and the modulation component extraction circuit, and a wobble signal decoding circuit for outputting an address signal by decoding a wobble signal from the crosstalk correction circuit.

A program and an information recording medium of the present invention are a program for causing a computer to carry out the wobble signal processing method of the present invention and an information recording medium storing the program. Further, the recording method and the reproducing method of present invention uses the wobble signal processing method of the present invention.

According to the present invention, there can be obtained an optical disc recording or reproducing method, an optical disc apparatus, and a recording medium capable of stably reproducing an address even from an original wobble signal in which a wobble signal is mixed with a crosstalk and noise and having a high positioning accuracy.

Figure 1:
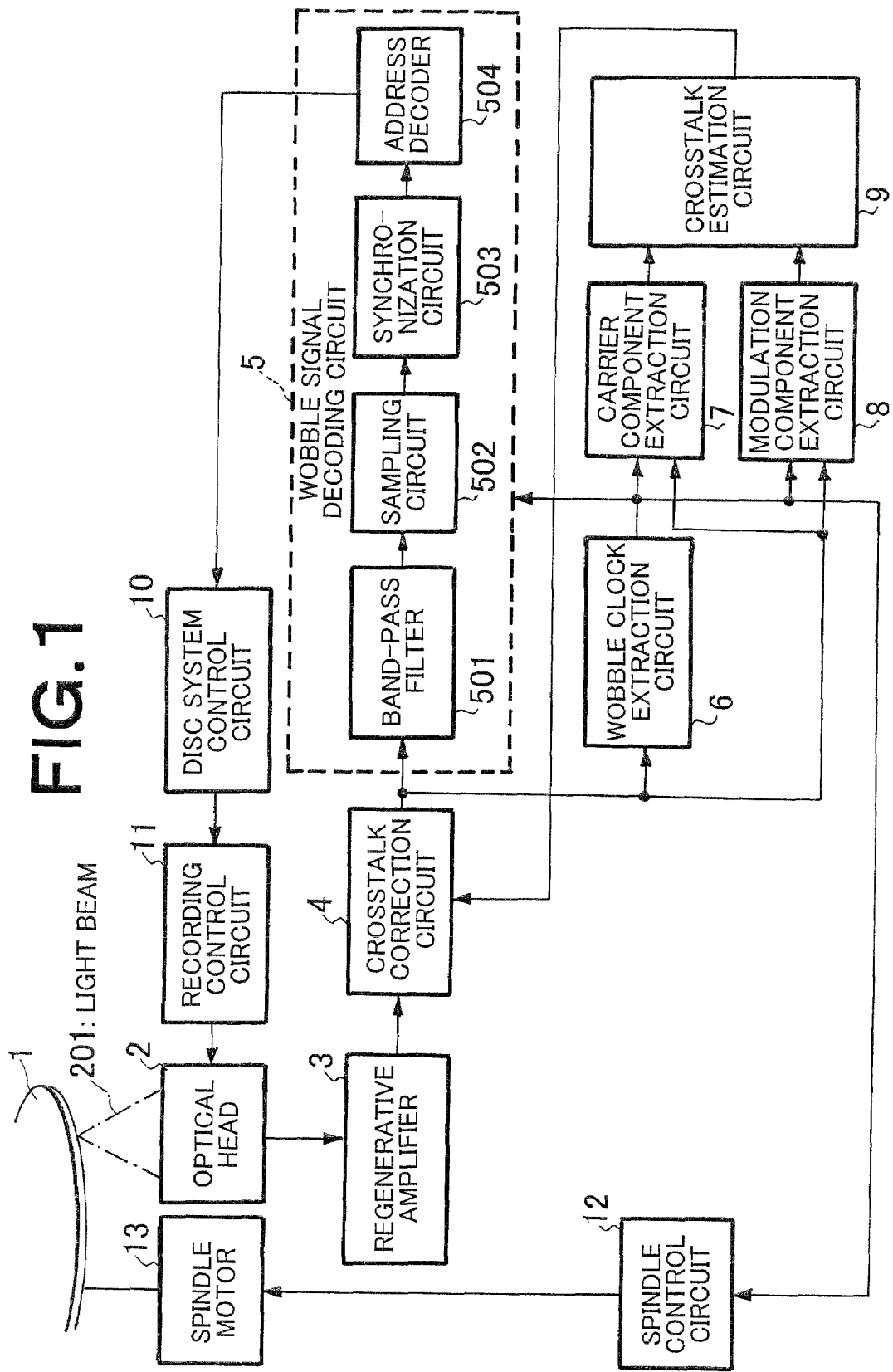
FIG. 1 is a block diagram of an optical disc apparatus as a recording apparatus according to a first embodiment of the present invention.

REFERENCE NUMERALS 1 optical disc
2 optical head
3 regenerative amplifier
4 crosstalk correction circuit
5 wobble signal decoding circuit
6 wobble clock extraction circuit
7 carrier component extraction circuit
8, 81, 82 modulation component extraction circuit
9 crosstalk estimation circuit
801 band-pass filter
802 sampling circuit
803 modulating portion tentative determination circuit
804, 808 modulation component estimation circuit
805 estimating carrier generation circuit
806, 807 synchronization detection circuit

BEST MODE FOR CARRYING OUT THE INVENTION

Embodiments of the present invention will be described below in detail referring to the accompanying figures.

The embodiments of the present invention will be explained below in detail referring to the accompanying figures to clarify the above and other objects, the feature, and the advantage of the present invention.

FIG. 1 shows a block diagram of an optical disc apparatus according to a first embodiment of the present invention. The optical disc apparatus is different from the optical disc apparatus shown in the embodiment of FIG. 13 in that it includes a crosstalk correction circuit 4, a carrier component extraction circuit 7, a modulation component extraction circuit 8, a crosstalk estimation circuit 9, and the regenerating (reproducing) control circuit 16 is removed from it and a recording apparatus is constituted. It is needless to say that a recording and reproducing apparatus may be constituted by providing it with the regenerating control circuit 16. The crosstalk correction circuit 4, the carrier component extraction circuit 7, the modulation component extraction circuit 8, the crosstalk estimation circuit 9, and the wobble signal decoding circuit 5 constitutes a wobble signal processing system. A regenerative amplifier 3 obtains a signal which changes according to the meandering of groove by calculating the difference of the current outputs obtained from a not shown photodetector, which is disposed in an optical head 2 and divided into two portions in a direction along the groove, likewise the example of the related art shown above. Since the thus obtained original wobble signal includes a crosstalk due to the meandering of adjacent grooves, phase dislocation and an amplitude variation are added to a signal corresponding to the meandering of a target groove.

Figure 2:
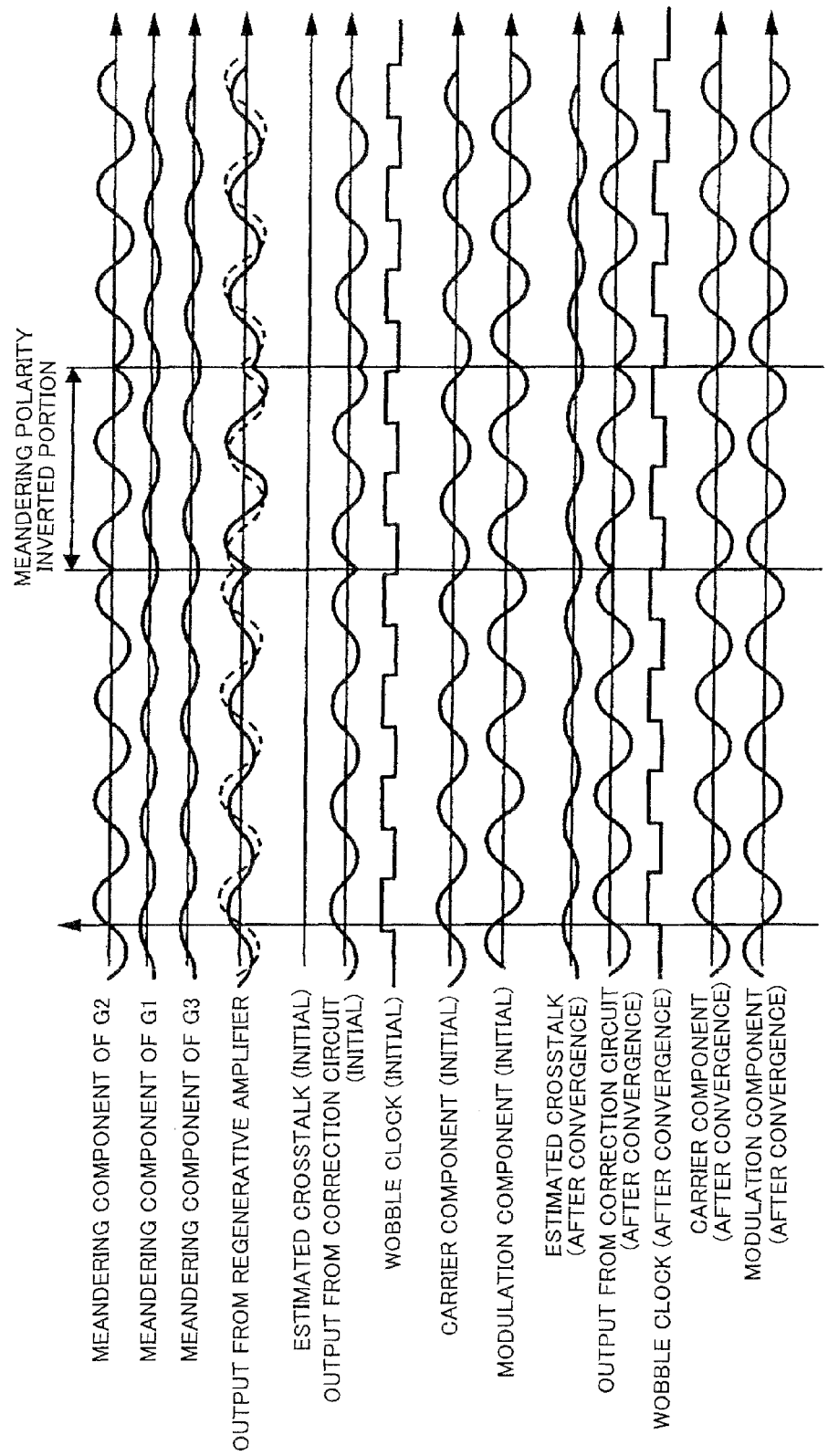
FIG. 2 is a view showing operation waveforms of the recording apparatus in the present invention and a view explaining an original wobble signal including a crosstalk obtained from a regenerative amplifier.
Figure 14:
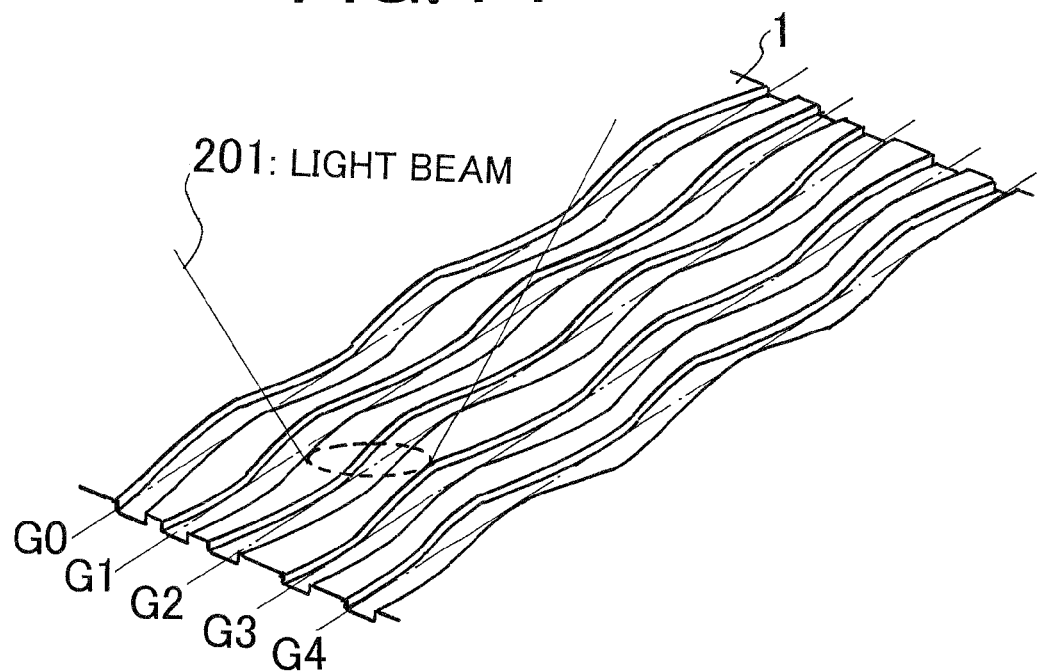
FIG. 14 is a view conceptually showing grooves on an the optical disc and a light beam converging on the groove.

The original wobble signal including the crosstalk obtained from the regenerative amplifier 3 will be explain using FIG. 2. It is assumed that a light beam is converged on a groove G2 as shown in FIG. 14. When a component received by the photodetector is only a component corresponding to the meandering of the groove G2, the signal obtained from the regenerative amplifier 3 is made to a sine waveform approximately proportional to the dislocation of the groove as shown by a dotted line. When the meandering phase of the groove is modulated 180°, an obtained sine wave has a phase inverted in the portion shown as a meandering polarity inversion range. However, since a portion of the light beam also impinges on adjacent grooves G1 and G3, the component corresponding to the meandering of the groove G1 and the component corresponding to the meandering of the groove G3 are also received by the photodetector.

The signal obtained from the regenerative amplifier 3 is a signal obtained by adding the meandering components of the grooves G1 and G3 to the meandering component of the groove G2 as shown by a solid line. In the illustrated example, the phase and amplitude of the waveform of the signal are dislocated to the waveform of the dotted line having only the meandering component of the groove G2. The amount of dislocation of the phase and amplitude are different depending on the difference between the phase of the adjacent tracks added as a crosstalk and the phase of the target track. When, for example, the phase of the adjacent tracks is the same as that of the target track, the amplitude of the signal obtained from the regenerative amplifier 3 increases, whereas when it is an inverse phase, the amplitude decreases. Note that since the influence of the crosstalk from grooves G0 and G4 which are located further externally of the grooves G1 and G3 is small, the explanation of these grooves is omitted.

The crosstalk correction circuit 4 of FIG. 1 acts to extract a component corresponding to the meandering of the groove G2 shown by the dotted line by subtracting the crosstalk component from adjacent tracks estimated by the crosstalk estimation circuit 9 from the output of the regenerative amplifier 3 including a crosstalk. The operation of respective circuits for estimating a crosstalk component will be shown below in detail.

A estimated (presumed) crosstalk output from the crosstalk estimation circuit 9 starts operation using a signal having an amplitude 0 as an initial value. The crosstalk correction circuit 4 outputs a corrected signal by subtracting the estimated crosstalk from the signal including the crosstalk obtained from the regenerative amplifier 3. In an initial state, an output of the crosstalk correction circuit 4 is the same as the output of the regenerative amplifier 3. A wobble clock extraction circuit 6 creates a timing synchronized with the phase of the crosstalk correction circuit 4 using the output of the crosstalk correction circuit 4 and outputs the timing. When the length of a meandering polarity inverted portion is sufficiently shorter than that of a non-inverted portion, a desired phase synchronized output can be obtained only by using a band-pass filter and a phase synchronization circuit as the wobble clock extraction circuit 6 and applying phase synchronization to a signal passed through the band-path filter by a PLL.

The dislocation of an amplitude and phase due to a crosstalk remains in the output of the crosstalk correction circuit 4 until the estimated crosstalk converges to a proper value. Accordingly, the wobble clock obtained from The wobble clock extraction circuit 6 is also obtained as a signal whose phase is dislocated to a carrier phase corresponding to the meandering component of the target groove G2.

The carrier component extraction circuit 7 extracts a component in agreement with the phase of the wobble clock from the output of the crosstalk correction circuit 4 based on the phase of The wobble clock. When the rate of the meandering polarity inverted portion is small, an approximately correct carrier component can be determined by sampling the signals output from the crosstalk correction circuit 4 at the respective points at which the wobble clock has 90° and 270° phases and determining the average value of amplitudes.

Note that a carrier component can be estimated at a higher accuracy by reducing the influence of noise and the influence of an error caused by the polarity inverting portion by providing the input stage of the carrier component extraction circuit 7 with a band-pass filter, which has a pass band in the vicinity of a wobble frequency to the output of the crosstalk correction circuit 4 as well as providing the input stage with a function for averaging sampling values excluding those having a peculiar value. Since it is sufficient for the carrier component extraction circuit 7 to output information indicating how many components there are having the same phase as the phase of the wobble clock included in the output of the crosstalk correction circuit 4, an output signal may be only a value showing the amplitude of a sine wave. FIG. 2 shows a sine wave signal whose phase is synchronized with the wobble clock, as the carrier component for the convenience of explanation. A carrier component, which is estimated in the initial state in which the estimated crosstalk is 0, is a signal whose phase and amplitude are dislocated by the influence of a crosstalk.

The modulation component extraction circuit 8 acts to extract the amplitude and phase of the portion, which has an inverted meandering polarity, from the output of the crosstalk correction circuit 4 based on the phase of the wobble clock. Although an arrangement example of the modulation component extraction circuit 8 is described later, the circuit 8 can extract a modulation component by detecting portions having a phase near to an inverted phase to the phase of a wobble clock and calculating the average value of the phases and amplitudes of the portions. The signal output here has the amplitude of a sine wave component corresponding to an inverted phase to the wobble clock and the amplitude of a sine wave component orthogonal to the wobble clock. FIG. 2 shows a modulation component extracted as a sine waveform obtained from the sum of the inverted phase components and the orthogonal components for the convenience of explanation.

The phase and the amplitude of a crosstalk component mixed with the output of the regenerative amplifier 3 when the light beam is converged on the groove G2 depend on the meandering phases of the adjacent grooves G1 and G3 and how the light beam expands. The balance between the crosstalk from the groove G1 and the crosstalk from the groove G3 is also changed when the converging position of the light beam is dislocated from the center of the groove G2. However, the meandering phase of the groove G2 and the meandering phases of the grooves G1 and G3 keep a predetermined difference over several hundred to several thousand of wobble cycles when viewed in a time axis. The difference of the meandering phases between adjacent tracks changes very gently and ordinarily has an amount of change of about 360° while a disc rotates one or several times. Further, since the balance of the crosstalks from the grooves G1 and G3 is determined by the shape of the converged light beam, the shape of the grooves, the electric offset of a not shown circuit for controlling the position of the light beam, and the like, no abrupt change ordinarily appears to the balance.

Accordingly, any of the crosstalk components from the grooves G1 and G3 is made to a sine waveform having an approximately constant phase difference to the meandering phase of the groove G2 over several hundred to several thousand of wobble cycles and the balance between them is also made to an approximately constant balance. As a result, the component of the sum of them can be contemplated as a sine waveform having a constant phase difference to a carrier signal corresponding to the meandering phase of the groove G2.

The crosstalk estimation circuit 9 of FIG. 1 estimates a crosstalk component by making use that the crosstalk component mixed with the output of the regenerative amplifier 3 is approximated by a sine waveform having an approximately constant phase difference to the carrier signal of the groove G2.

The estimated value of the carrier component extracted by the carrier component extraction circuit 7 and the estimated value of the modulation component extracted by the modulation component extraction circuit 8 are given to the crosstalk estimation circuit 9. Cancellation is carried out between the component, in which the groove G2 meanders in the same phase as the phase of the carrier signal, and the component, in which the groove G2 meanders in an inverted phase as signals having an inverted phase by adding the sine wave expressing the estimated value of the carrier component and the sine wave expressing the estimated value of the modulation component. The remaining component is the remaining component of the crosstalk mixed in an approximately constant phase to the respective regions which meander in the same phase with and an inverted phase to the carrier signal.

The crosstalk estimation circuit 9 outputs the phase and amplitude of the sine wave output as a estimated crosstalk while sequentially updating them by the remaining component of the crosstalk. The crosstalk estimation circuit 9 includes a holding circuit (not shown) for holding the phase and amplitude of the sine wave output as the estimated crosstalk, and the phase and amplitude of the sine wave are sequentially updated by the remaining component of the crosstalk and held. The update is carried out by adding a constant $\alpha$ times the remaining component of the obtained crosstalk to, for example, the sine wave output as the estimated crosstalk. The estimated crosstalk output from the crosstalk estimation circuit 9 is fed back to the crosstalk correction circuit 4 and acts to gradually reduce the remaining component of the crosstalk included in the output of the crosstalk correction circuit 4. The constant $\alpha$ is set to a small value, for example, about 1/1000 by which the stability of a closed loop can be secured, wherein the closed loop is composed of the crosstalk correction circuit 4, the carrier component extraction circuit 7, the modulation component extraction circuit 8, and the crosstalk estimation circuit 9. In this instance, the constant $\alpha$ is set in consideration of the responses of the carrier component extraction circuit 7 and the modulation component extraction circuit 8.

When the update is continued as described above, the estimated crosstalk waveform output from the crosstalk estimation circuit 9 is converged to approach to the total amount of the crosstalk component included in the output waveform of the regenerative amplifier 3. After the convergence, the waveform output from the correction circuit does not include a component corresponding to the meanderings of the grooves G1 and G3, thereby a signal corresponding to the meandering component of the groove G2 can be obtained. Since the wobble clock is controlled so as to be synchronized with the output of the crosstalk correction circuit 4, the influence of phase dislocation resulting from the crosstalk is cancelled and a signal synchronized with the carrier component of the groove G2 can be obtained. Further, the output signal of the carrier component extraction circuit 7 shows the phase and amplitude in the same phase range (the in-phase range) as the carrier signal in the meandering component of the groove G2, and the output of the modulation component extraction circuit 8 shows the amplitude and phase in the range modulated by a phase inverted to the phase of the carrier signal.

After the convergence, the crosstalk component is removed from the output of the crosstalk correction circuit 4. The wobble clock extraction circuit 6 can also extract a wobble clock which includes no phase dislocation. Accordingly, the wobble signal decoding circuit 5 can stably decode a correct address without being influenced by the crosstalk component.

The disc system control circuit 10 specifies a recording position using the address extracted as described above and forms a recording mark on the optical disc 1 through the recording control circuit 11 and the optical head 2. As a result, the recording mark can be formed at high positioning accuracy at all times.

The amount of phase dislocation of the wobble clock caused by a crosstalk is varied depending on the difference between the meandering phases of grooves adjacent to each other. Although the change of the difference between the meandering phases also depends on a meandering frequency, it is ordinarily about 360° while the disc rotates one or several times as described above. Accordingly, when the number of rotation of a spindle motor is controlled by the spindle control circuit 12 so that the frequency of the wobble clock becomes constant in cases where no crosstalk is corrected, the influence of the phase dislocation caused by the crosstalk remains and the positioning accuracy cannot be secured. In contrast, when the arrangement of the embodiment which can extract the wobble clock including no influence of the crosstalk component is used, the influence of the phase dislocation caused by a crosstalk can be eliminated when the spindle control is carried out, and thereby a higher positioning accuracy is liable to be secured.

Next, an arrangement example of the modulation component extraction circuit 8 will be explained referring to FIG. 3 and to FIG. 4 which shows an operation waveform of the circuit 8.

A modulation component extraction circuit 81 is applied with a wobble clock, which is extracted by the wobble clock extraction circuit 6 and synchronized with the output signal of the crosstalk correction circuit 4, together with the waveform output by the crosstalk correction circuit 4. FIG. 4 shows a waveform when a crosstalk component remains in the output signal from the crosstalk correction circuit 4. The output signal of the crosstalk correction circuit 4 first passes through a band-pass filter 801 having a pass band in the vicinity of the wobble frequency and then sampled by a sampling circuit 802 at the timings at which the phase of the wobble clock is set to 0°, 90°, 180°, 270°.

Figure 4:
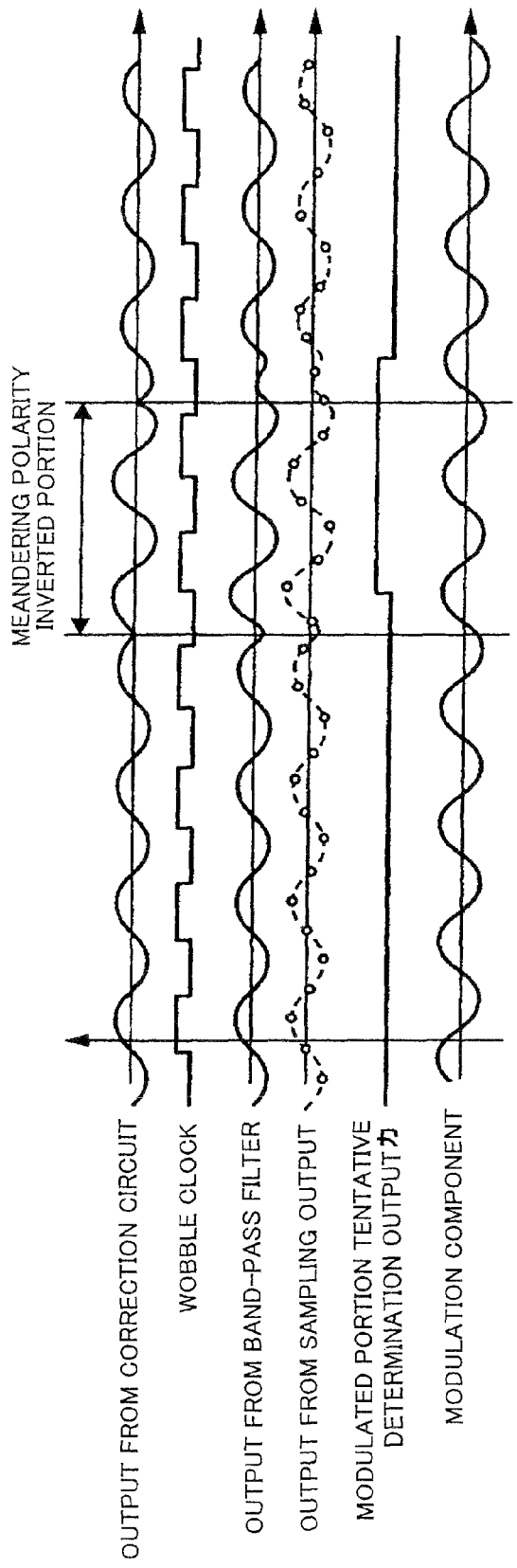
FIG. 4 is a view showing operation waveforms of the modulation component extraction circuit shown in FIG. 3.

Marks "o" of FIG. 4 show the points where the sampling is carried out. Since the signal passed through the band-pass filter includes only the components in the vicinity of the wobble frequency, it is contemplated that the values, which are sampled at the points where the phase of the wobble clock is set to 0° and 90°, typical show the amplitudes of components orthogonal to each other. In the range in which the meandering polarity meanders in the same phase as the phase of the carrier signal, the value sampled at the point where the phase of the wobble clock is 0° is near to 0, whereas the value sampled at the point where the phase of the wobble clock is 90° has a predetermined positive value corresponding to the amplitude of the carrier component.

A modulating portion tentative determination circuit 803 extracts a range, in which a value out of a sampling value is obtained when the meandering polarity meanders in the same phase as the phase of the carrier signal, as a modulating portion tentative determination range based on a pair of values sampled at the respective a points where the phase of the wobble clock is set to 0° and 90°. Further, to prevent a estimation error, a modulation component estimation circuit 804 can estimate the components which have the same phase as or orthogonal to the phase of the carrier signals in the modulation components by extracting a pair of sampling values showing values most apart from the phase and amplitude of the carrier signal in the sampling values in a tentatively determined range as well as averaging the similar values obtained in a past modulating portion tentative determination range using a low-pass filter.

Figure 3:
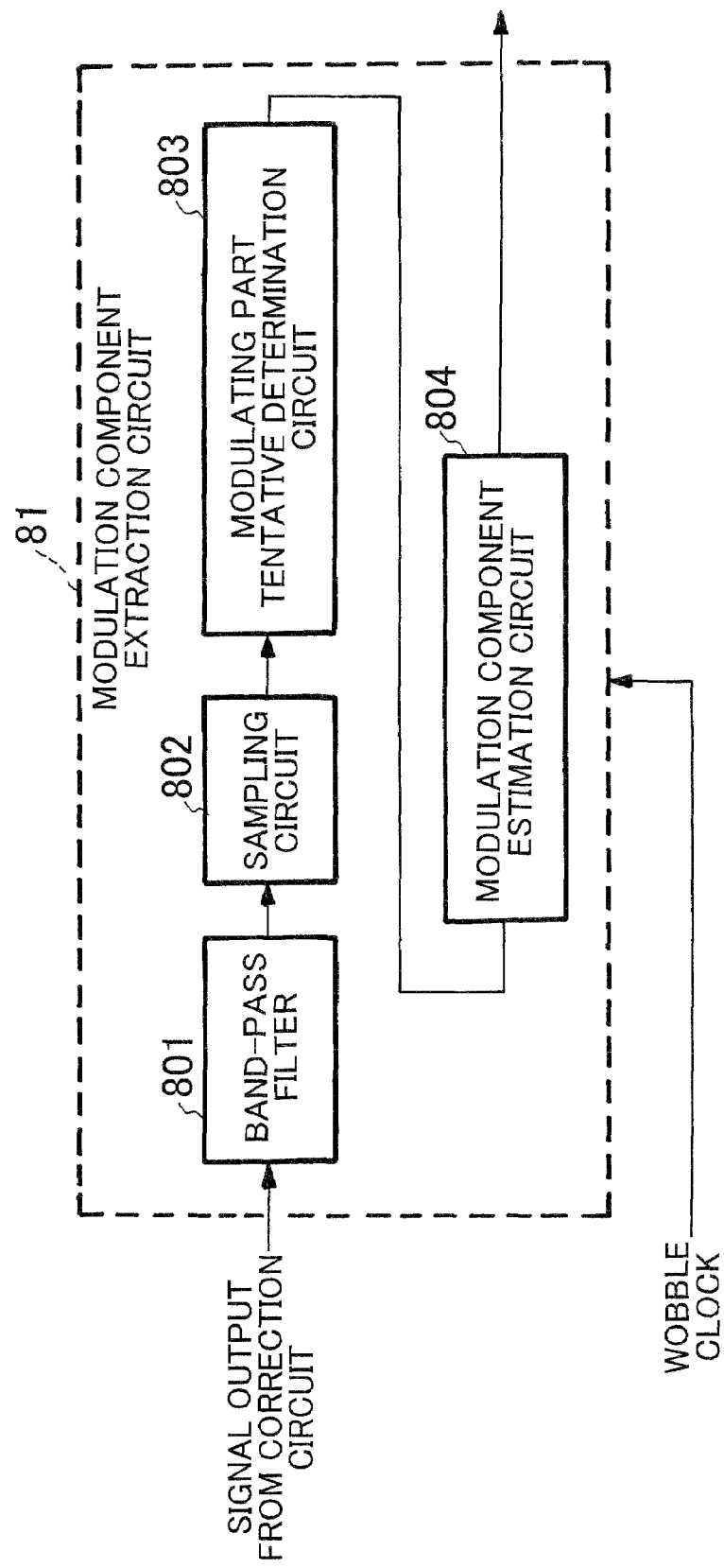
FIG. 3 is a view showing an arrangement example of a modulation component extraction circuit.

Since the disturbance of a waveform caused to a filter output by scratches and defects on a disc can be reduced by reducing the pass band of the band-pass filter 801 disposed to the modulation component extraction circuit 81 of FIG. 3 as much as possible, the frequency of erroneously recognizing the modulating portion tentative determination range can be reduced. Accordingly, as to a format, in which it is known by, for example, a modulation rule that the meandering polarity inversion certainly continues for four or more cycles of the carrier signal, it is preferable to set the value Q (Quality factor) of the band-pass filter 801, which is given by the rate of a central frequency and a pass band width, to about 4. As a result, when a polarity inverted signal is continuously input for at least four cycles, a signal, which approximately agrees with the phase and amplitude of a meandering polarity determining portion can be obtained from the band-pass filter. The phase of the meandering polarity inverted portion can be extracted with a high accuracy by extracting a pair of sampling values showing the values most apart from the phase and amplitude of the carrier signal in the values obtained by sampling the outputs of the band-pass filter 801.

When the meandering polarity inverted portion is formed of one cycle of the carrier signal or made to an MSK modulation mark sandwiched between regions meandering at a frequency of 1.5 times as shown in, for example, Patent Document 1, it is sufficient to set the value Q of the band-pass filter 801 to about one to reflect the amplitude and phase of the input signal which is obtained approximately inverting the output of the filter within the time during which the input signal of the meandering polarity inverted portion is given. With this arrangement, the phase and amplitude of the meandering polarity inverted portion can be extracted likewise the meandering polarity inverted portion shown in FIG. 4.

However, when the value Q is set to a small value, erroneous recognition is liable to increase due to the scratches and the like on the disc. When the value Q of the band-pass filter is set to two or more, a crosstalk component can be correctly estimated by carrying out processing while taking the characteristics into consideration on the crosstalk estimation circuit side.

Figure 5:
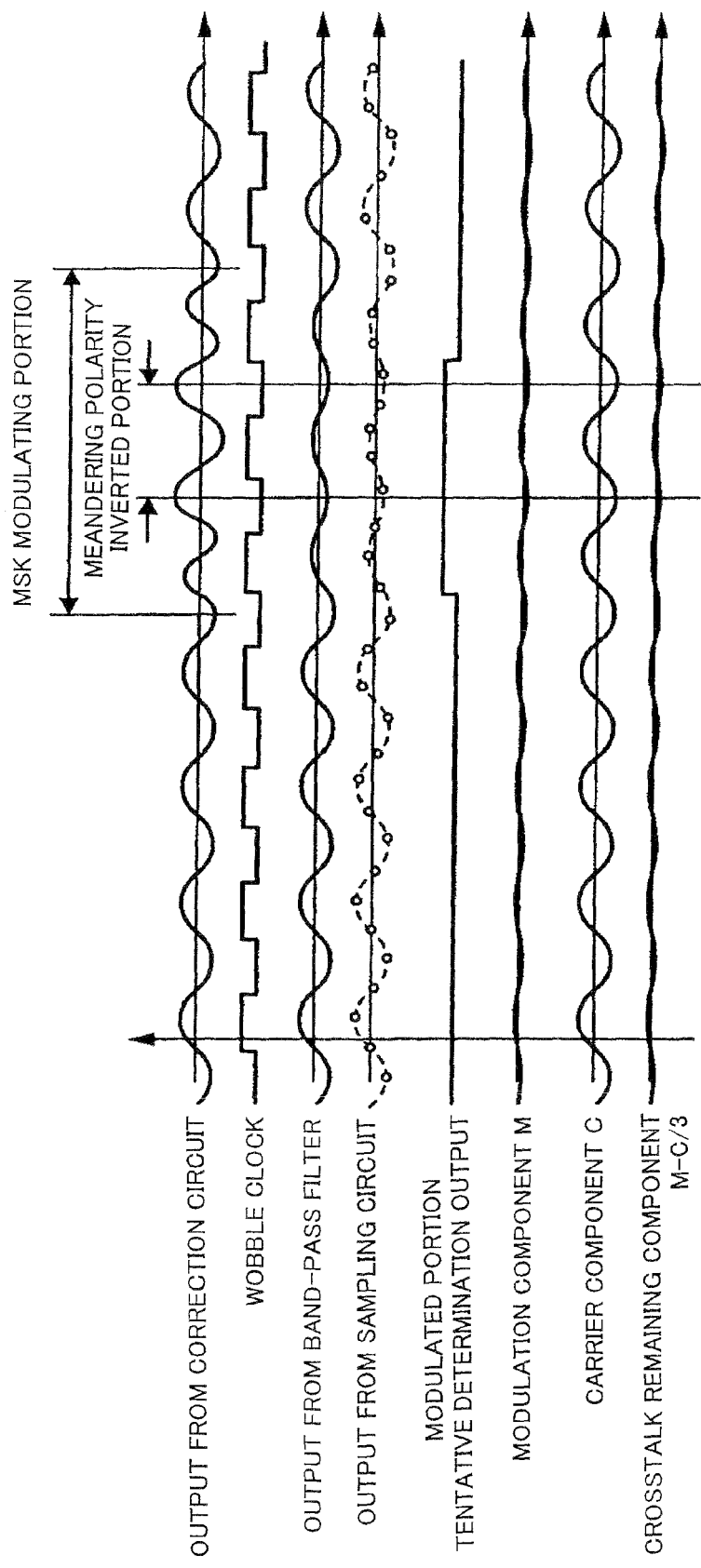
FIG. 5 is a view showing an example of operation waveforms of a modulation component extraction circuit when Q is set to a value of two or more in cases where recording is carried out using MSK modulation in which a meandering polarity inverted portion corresponds to one cycle of a carrier signal.

FIG. 5 shows an example of the operation waveform of the modulation component extraction circuit 81 when the value Q is set to two or more in cases where recording is carried out using an MSK modulation in which the meandering polarity inverted portion corresponds to the one cycle of the carrier signal. When the value Q of the band-pass filter 801 is set to a large value, the output of the filter does not agree with the phase and amplitude of the inverting portion within the time during which the input signal of the meandering polarity inverted portion is given. The output amplitude of the filter, for example, is reduced to the MSK modulation mark.

The sampling circuit 802 samples the output waveform every 90° phase of the wobble clock. The modulating portion tentative determination circuit 803 tentatively determines a modulated portion based on the sampling values corresponding to the 0° and 90° phases of carrier signal using a determination standard of whether or not an amplitude is less than a predetermined value. The modulation component extraction circuit 804 estimate the modulated component by extracting a pair of sampling values showing the values most apart from the phase and amplitude of the carrier signal from the sample values in the tentatively determined range as well as averaging the similar values obtained in the modulating portion tentative determination range appeared in the past.

Here, the value estimated as the modulation component does not directly shows the amplitude and phase corresponding to the meandering polarity inverted portion in the output from the correction circuit because the value Q of the band-pass filter 801 is increased and shows the amplitude and phase including also the influence caused by the amplitude and phase of the waveforms in front of and behind the meandering polarity inverted portion at a predetermined rate. A processing example is shown here assuming that the amplitude and phase extracted as the modulation component includes the one third of the component showing the phase and amplitude of the meandering polarity inverted portion and the two thirds of the component of the portion which meanders in the same phase as the phase of the carrier signal. Although the rate is determined by the characteristics of the band-pass filter, even if the rate changes, the processing can be carried out by the same procedure. When a component having the same phase as the phase of the carrier signal is added to a component having an inverted phase at the rate of 1:1, a component proportional to the amount of crosstalk can be extracted. Accordingly, the crosstalk estimation circuit 9 multiplies the estimated value of the carrier component by ⅓ and subtracts a resultant value from the estimated value of the modulation component in place of simply adding an input carrier component C and a modulation component M. As a result, the ratio of the same phase component and the inverted phase component is set to 1:1 and cancels with each other, thereby it is possible to take out the information of the phase and amplitude proportional to the crosstalk component mixed with the output of the correction circuit as a crosstalk remaining component.

The crosstalk estimation circuit 9 can apply feedback such that the remaining component of the crosstalk is gradually reduced by updating the phase and amplitude of a sine wave to be output as a estimated crosstalk based on the remaining component.

Figure 6:
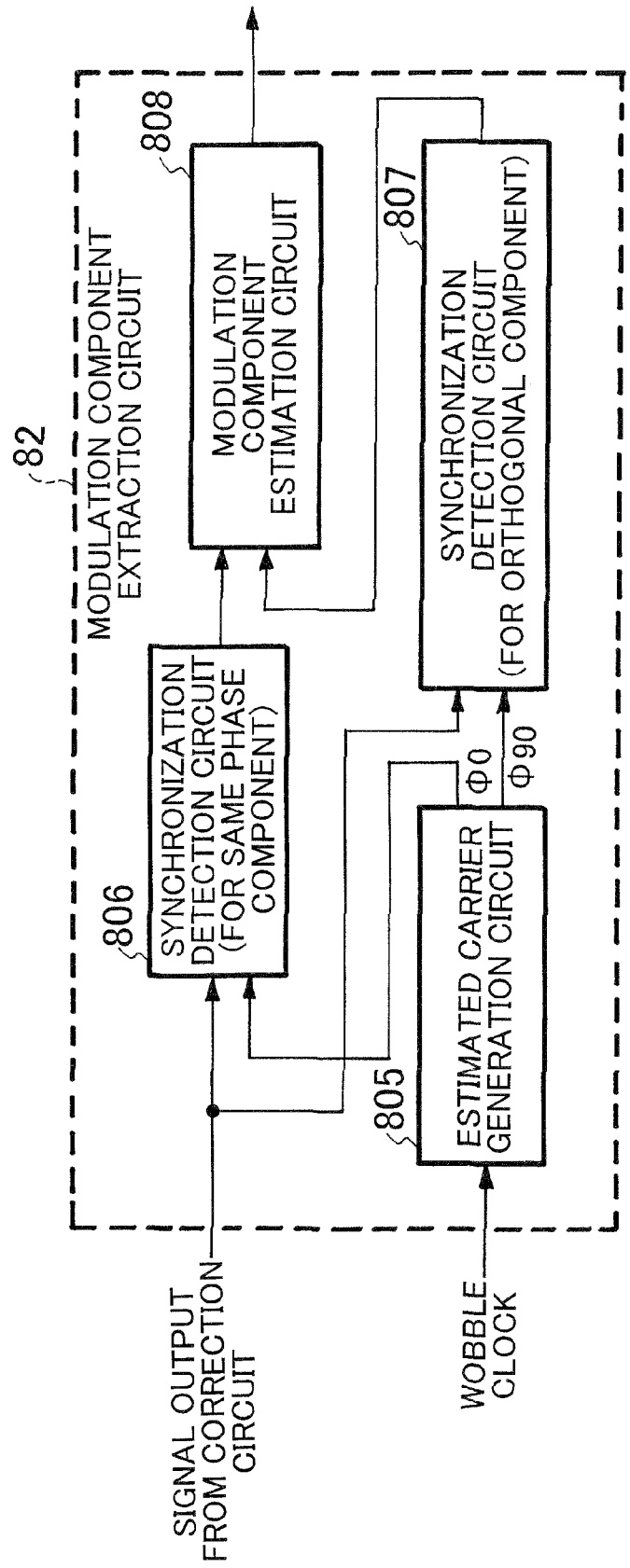
FIG. 6 is a view showing a second arrangement example of the modulation component extraction circuit.
Figure 7:
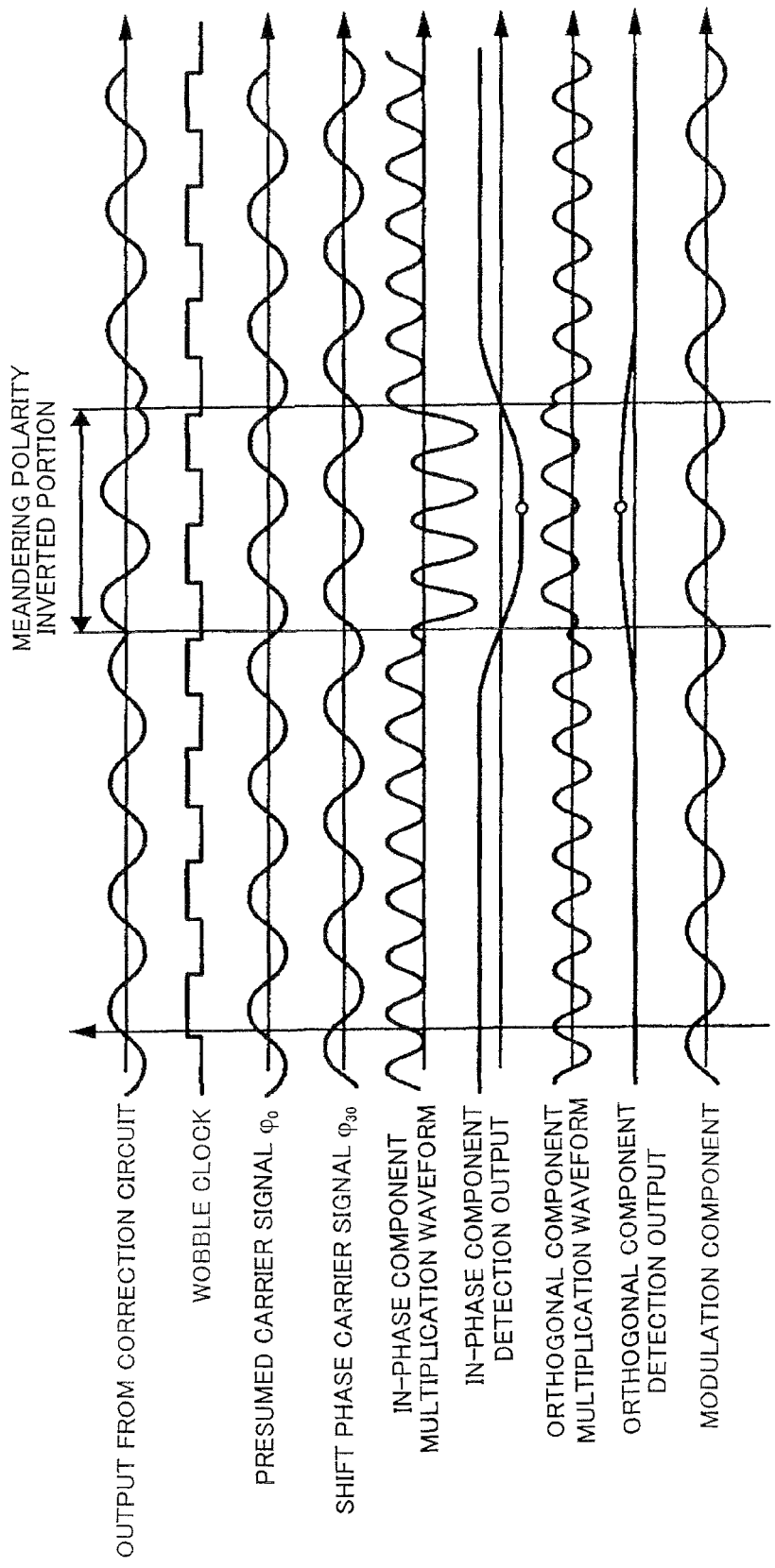
FIG. 7 is a view showing operation waveforms of the modulation component extraction circuit shown in FIG. 6.

Next, a second arrangement example of the modulation component extraction circuit 8 will be explained referring to FIG. 6 and FIG. 7 which show the operation waveform thereof.

First, an internal estimating carrier generation circuit 805 generates a sine wave having the same phase as the phase of the wobble clock as a presumed (estimated) carrier signal φ0 and a sine wave whose phase advances 90° than the estimated (presumed) carrier signal as a phase shift carrier signal φ90 from the wobble clock input to the modulation component extraction circuit 82. The respective sine waves are input to synchronization detection circuits 806 and 807 for in-phase and orthogonal components, respectively and used as references for synchronously detecting the output of the crosstalk correction circuit which is input to the modulation component extraction circuit.

The synchronization detection circuit 806 provided for the in-phase component (the same phase) creates an in-phase component multiplication waveform from the output of the correction circuit and the estimated (presumed) carrier signal φ0 by multiplying them. Further, an in-phase component detection output is obtained by eliminating a component having a double carrier frequency by a low pass filter. The in-phase component detection output shows the same value as the amplitude of the sine wave having approximately the same phase as the phase of the carrier signal in the portion other than the meandering polarity inverted portion. Further, a meandering polarity inverted portion has a negative value and a peak value of the negative value approximately agrees with the amplitude of a component having an inverted phase to the phase of the carrier signal.

The synchronization detection circuit 807 provided for the orthogonal component also creates an orthogonal component multiplication waveform by multiplying the output of the correction circuit and the phase shift carrier signal φ90 and further outputs an orthogonal component detection output by eliminating a higher harmonic wave component by a low-pass filter.

A modulation component estimation circuit 808 is input with an in-phase detection component and an orthogonal detection component and captures the negative peak value of the in-phase detection component as the in-phase component of the meandering polarity inverted portion and an orthogonal detection component as an orthogonal component corresponding to it at the same timing. Further, the modulation component estimation circuit 808 estimates and outputs a modulation component by carrying out averaging using a low-pass filter and the like based on the in-phase component and the orthogonal component captured in the past. FIG. 7 shows a sine wave obtained by adding the thus obtained in-phase component and orthogonal component as a modulation component obtained by estimation. The crosstalk estimation circuit 9 can obtain a correct crosstalk estimated value from the modulation component extracted as described above.

Description as to the case, in which modulated portions exist in grooves G1 and G3 located adjacent to the inside and the outside of the groove G2, is omitted in the explanation carried out up to now. The grooves G1 and G3 also have modulated portions likewise the groove G2, and a meandering polarity may be inverted therein. When the light beam is converged on the groove G2, if the meandering polarities of the adjacent grooves G1 and G3 are inverted, the crosstalk of a component, which is different from that of the case in which the meandering polarities are not inverted, is mixed.

In the format of DVD+R and the like, the length of the meandering polarity inverted portion is sufficiently shorter than that of the portion in which the meandering polarity is not inverted. In the carrier component extraction circuit and the modulation component extraction circuit explained up to now, the carrier component and the modulation component are extracted by averaging the sampling values obtained by processing input signals. Accordingly, the influence of the crosstalk does not almost appear from the meandering polarity inverted portion which occurs less frequently, and a value obtained as a estimated crosstalk approximately agrees with the crosstalk from the carrier signal components of adjacent tracks.

Figure 8:
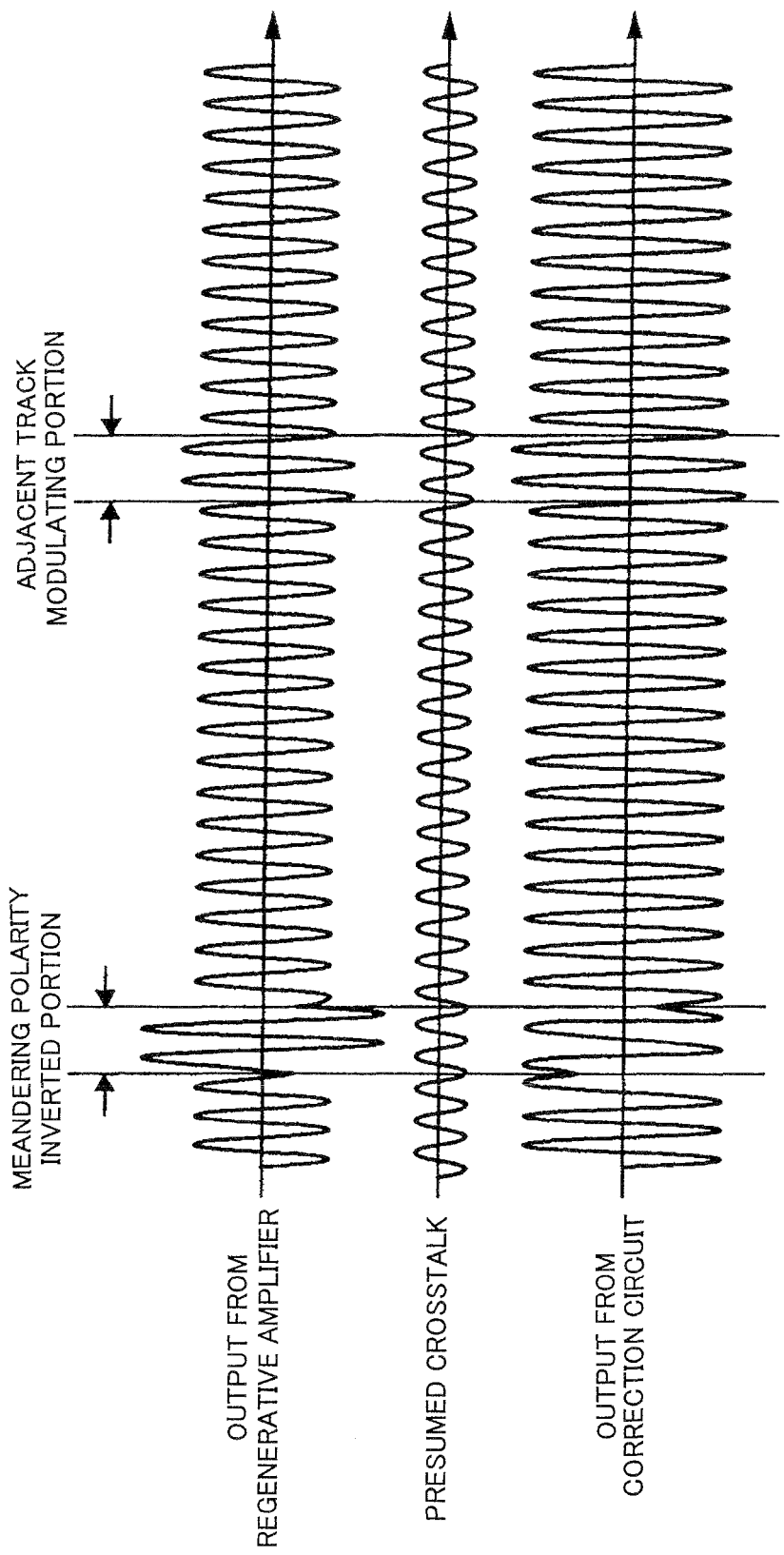
FIG. 8 is a view showing operation waveforms when adjacent tracks have a modulating portion and a meandering polarity is inverted.

FIG. 8 shows an operation waveform of the case in which a modulated portion exists in adjacent tracks and a meander-ing polarity is inverted. The output signal of the regenerative amplifier includes a crosstalk component from the adjacent tracks. The crosstalk components applied to the meandering polarity inverted portion and to other regions is made to a sine waves which approximately have a predetermined phase and amplitude to the carrier signal except the modulated portion of the adjacent tracks. The phase of the crosstalk component causes the amplitude and phase of the meandering polarity inverted portion, to which the phase of the crosstalk component is applied, to be dislocated from those of the other regions.

In the optical disc apparatus of the present invention, the crosstalk component is corrected by subtracting the estimated crosstalk output from the crosstalk estimation circuit from the output of the regenerative amplifier output to thereby decode the wobble signal and control the spindle motor. The estimated crosstalk is converged to the crosstalk component except the modulated portion of the adjacent tracks. Accordingly, an output waveform having approximately uniform amplitude can be obtained from the correction circuit except the modulated portion of the adjacent tracks.

Since as crosstalk component is not cancelled in the modulated portion of the adjacent tracks, the dislocation of an amplitude and phase appears to the output of the correction circuit. However, since a period during which the dislocation appears is short, ordinarily, the decoding characteristics of the wobble signal and the control characteristics of the spindle motor are not influenced by the dislocation.

When a format, in which the meandering polarity inverted portion has a relatively large rate, is used, it may be influenced by the crosstalk component from the modulated portion of the adjacent tracks. Even if this format is used, the influence can be reduced by employing a circuit arrangement as shown in FIG. 9.

Figure 9:
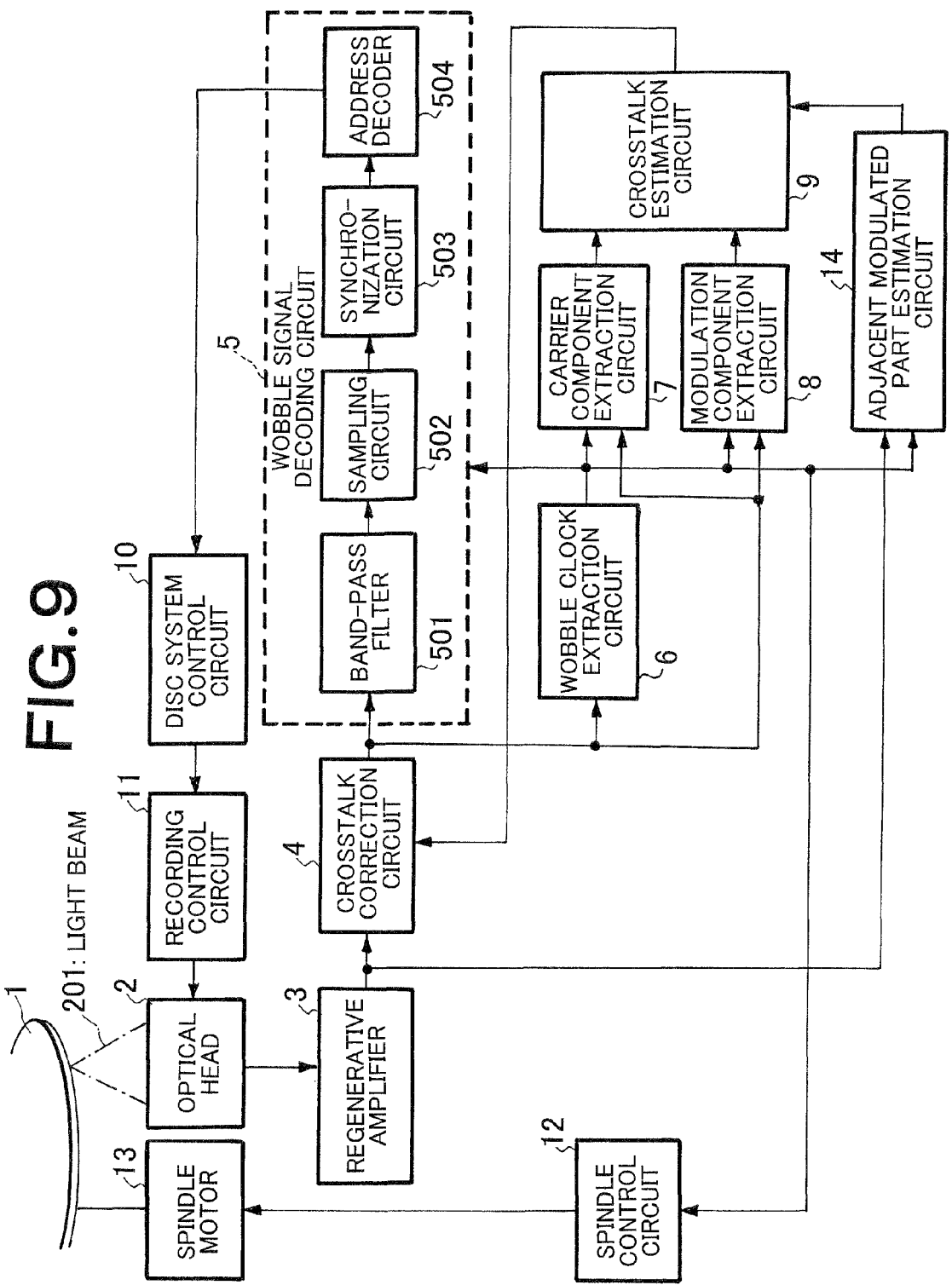
FIG. 9 is a block diagram of an optical disc apparatus as a recording apparatus according to a second embodiment of the present invention.

An adjacent modulated part (portion) estimation circuit 14 in FIG. 9 estimates the modulated portion of the adjacent tracks based on the signal output from the regenerative amplifier and outputs it. The modulated portion of the adjacent tracks has the same phase as the phase of the carrier component and can be estimated as a range which a difference between the amplitude of it and an average amplitude is equal to or more than a predetermined value.

Figure 10:
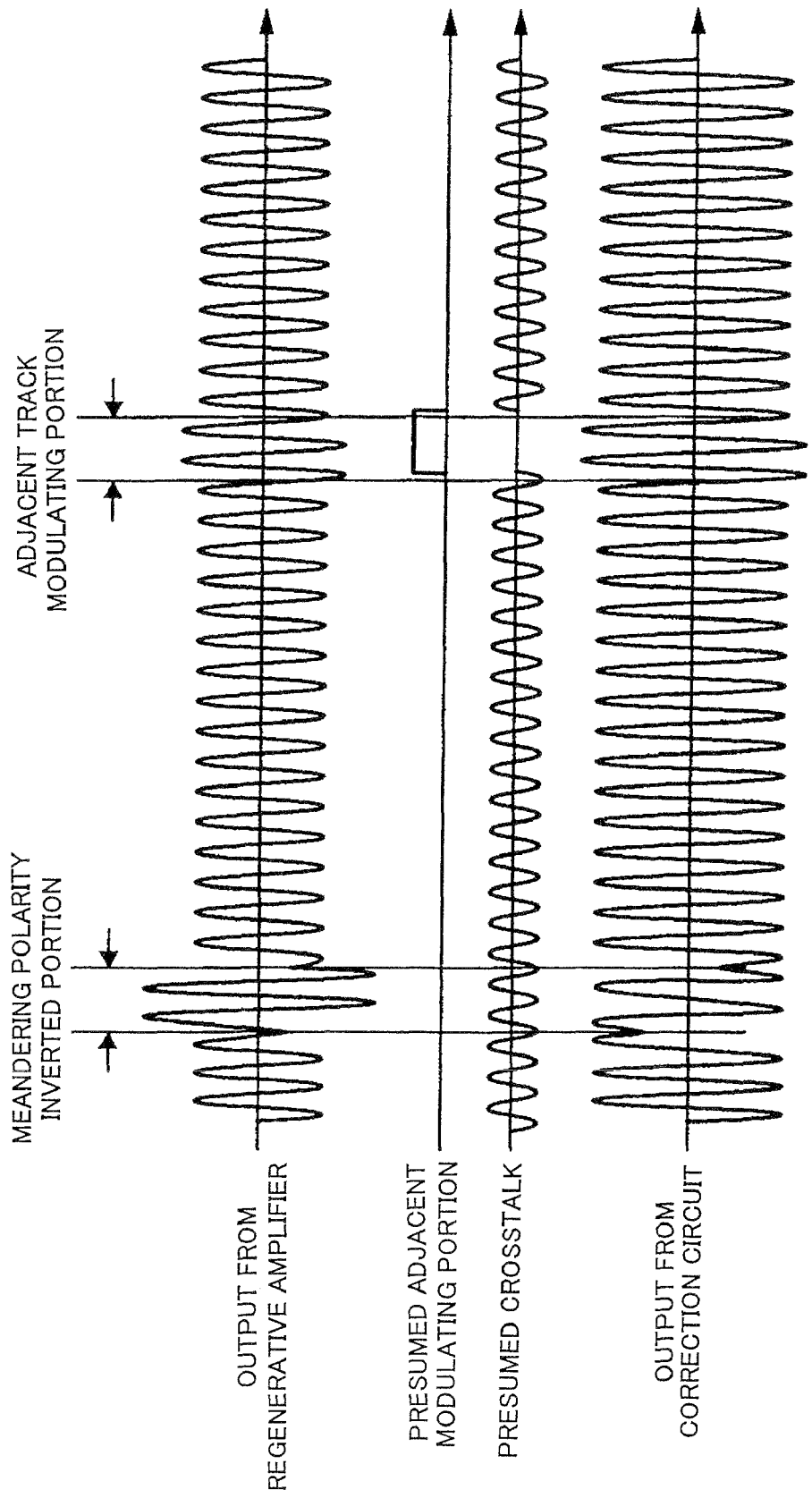
FIG. 10 is a view showing operation waveforms of the recording apparatus shown in FIG. 9.

The operation of the circuit will be explained referring to a waveform of FIG. 10. The adjacent modulated part estimation circuit 14 samples the outputs of the regenerative amplifier 3 at the respective points of 90°, 270° to the phase of a estimated carrier signal given by the wobble clock as well as determines the sampling values having the inverted phase to the phase of the estimated carrier signal based on the polarities thereof and calculates the moving average of only the sampling values having the same phase as the phase of the estimated carrier signal to thereby calculate the expected value of the amplitude in the region having the same phase as the phase of the estimated carrier signal. Further, the respective sampling values are compared with the obtained expected values in the region having the same phase as the phase of the estimated carrier signal, and when the difference therebetween exceeds, for example, 10%, it is estimated that the sampling point corresponds to the modulated portion of the adjacent tracks. The meandering polarity inverted portion is not determined as the modulated portion of the adjacent tracks because it has approximately the inverted polarity to the carrier component although it has a large difference of amplitude.

The crosstalk estimation circuit 9 temporarily replaces the output of the estimated crosstalk with a signal having an amplitude 0 in the region based on the estimated adjacent modulated portion signal output from the adjacent modulated portion estimation circuit. With this operation, no crosstalk component is corrected in the region which is estimated as the modulated portion of the adjacent tracks, and the same value as the output signal of the regenerative amplifier is output from the crosstalk correction circuit 4.

The influence of the crosstalk is not completely eliminated in the region estimated as the modulated portion of the adjacent tracks, and the amplitude and phase of the output signal of the crosstalk correction circuit are slightly varied. However, even if, for example, the modulated regions of both the adjacent tracks agree with each other, it is assumed that the amplitude of the crosstalk component remaining in the region is approximately the same as the amount of crosstalk from the regions other than the modulated region of the adjacent tracks, and thus the dislocation of the amplitude and phase is improved as compared with the case in which the estimated crosstalk is not replaced with the signal having the amplitude 0. Further, since the modulated regions of both the adjacent tracks often appear in different positions, respectively, the occurrence of dislocation of the amplitude and phase dislocation is ordinarily more suppressed.

When the output of the regenerative amplifier includes a lot of noise, the adjacent modulated part (portion) estimation circuit 14 of FIG. 9 may erroneously determine the modulated portion of the adjacent tracks. When the adjacent tracks are erroneously determined as the modulated portion frequently, the estimated (presumed) crosstalk is replaced with the amplitude 0 more often, thereby correction accuracy is deteriorated. The deterioration of accuracy caused by the erroneous determination can be prevented by providing the adjacent modulated portion estimation circuit with a function for cumulating the lengths of estimated adjacent modulated portions in each predetermined period and by stopping determining that the adjacent tracks corresponds to the modulated portion even if a condition of amplitude is satisfied when the cumulated lengths reach a predetermined value. In, for example, the DVD+R format, it is known that the four cycles in the 93 cycles of the carrier signal are modulated by the inverted phase at the most. Even if both the adjacent tracks are taken into consideration, the deterioration of accuracy can be prevented while protecting the modulated portion of the adjacent tracks by stopping an output when the total amount of the estimated adjacent modulated portions exceeds eight cycles per 93 cycles of the wobble clock.

Figure 11:
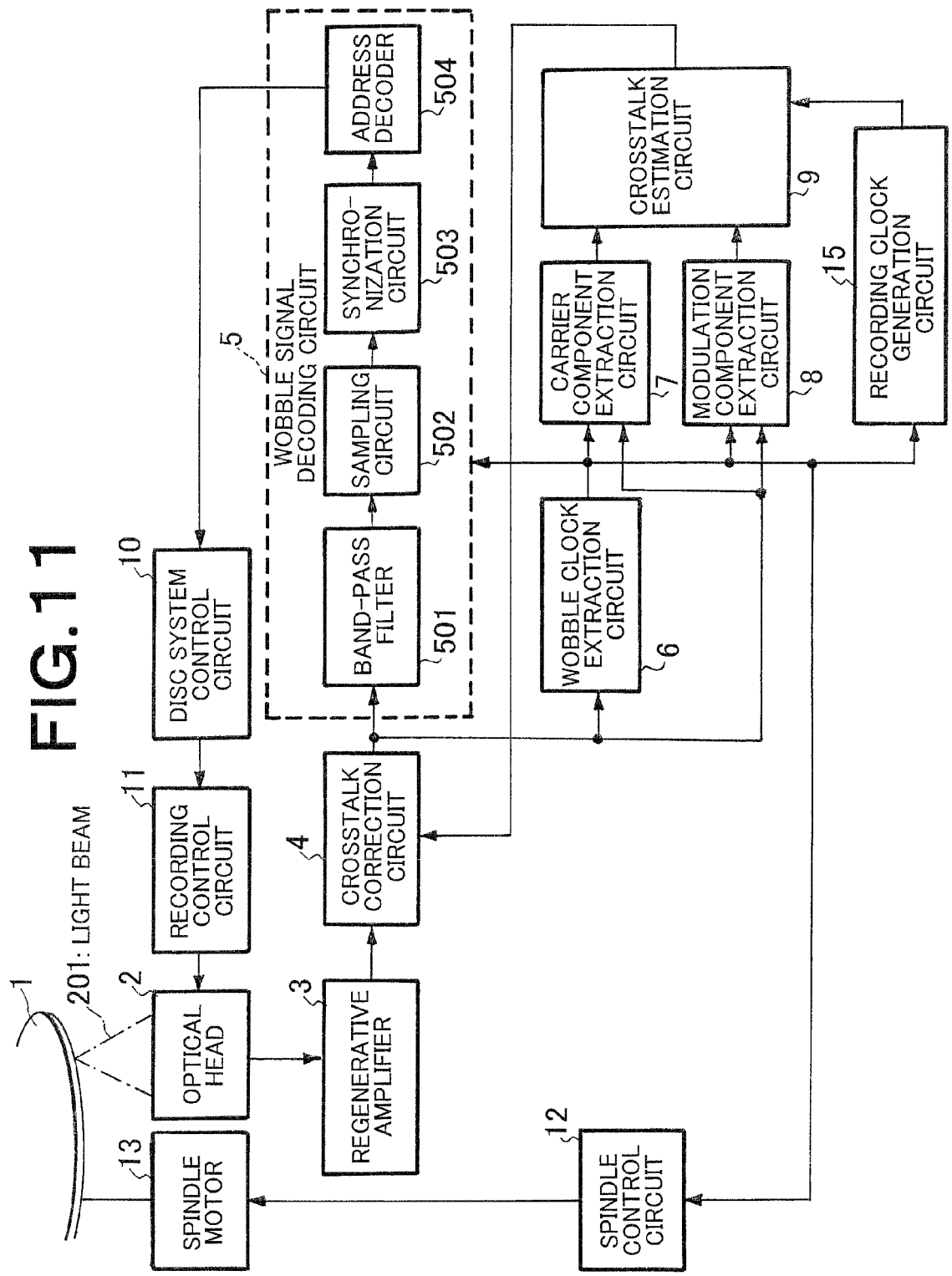
FIG. 11 is a block diagram of an optical disc apparatus as a recording apparatus according to a third embodiment of the present invention.

FIG. 11 shows an arrangement view when a clock synchronized with the wobble clock is created by a recording clock generation (creation) circuit 15 and used. The recording clock generation circuit 15 creates a recording clock which is integral-multiplied to the frequency of a recording channel by a phase synchronization circuit based on the wobble clock output from the wobble clock extraction circuit 6. The recording clock is supplied to the disc system control circuit 10 and used as a clock for managing a timing at which recording channel data is sent in place of a fixed frequency clock. Since the dislocation of the phase of the wobble clock can be corrected at a high accuracy by correcting the crosstalk component, an information pattern to be recorded on the optical disc can be positioned at a high accuracy by using the recording clock obtained by integral multiplication of the wobble clock.

Figure 12:
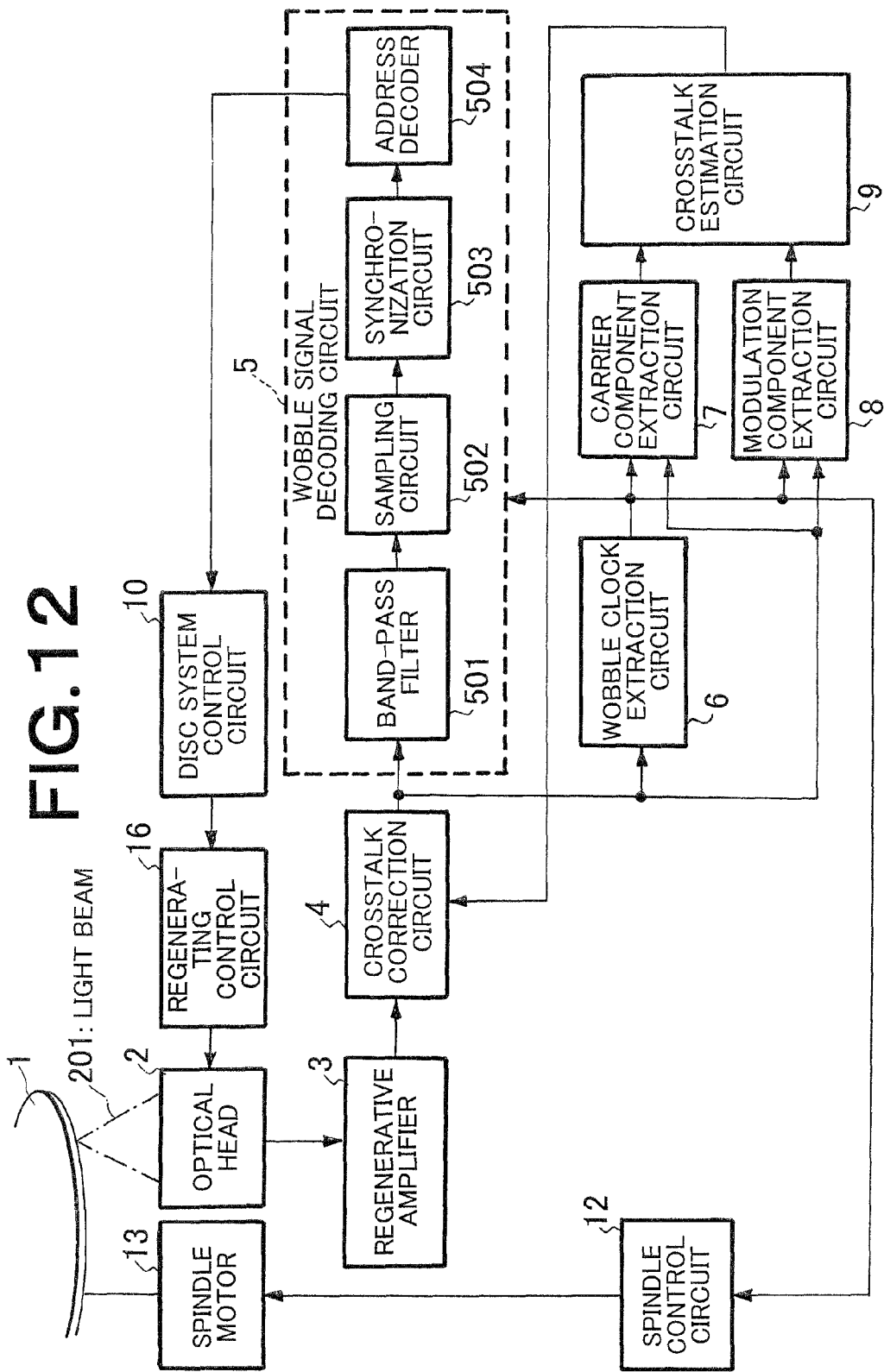
FIG. 12 is a block diagram of an optical disc apparatus as a reproducing apparatus according to a fourth embodiment of the present invention.
Figure 13:
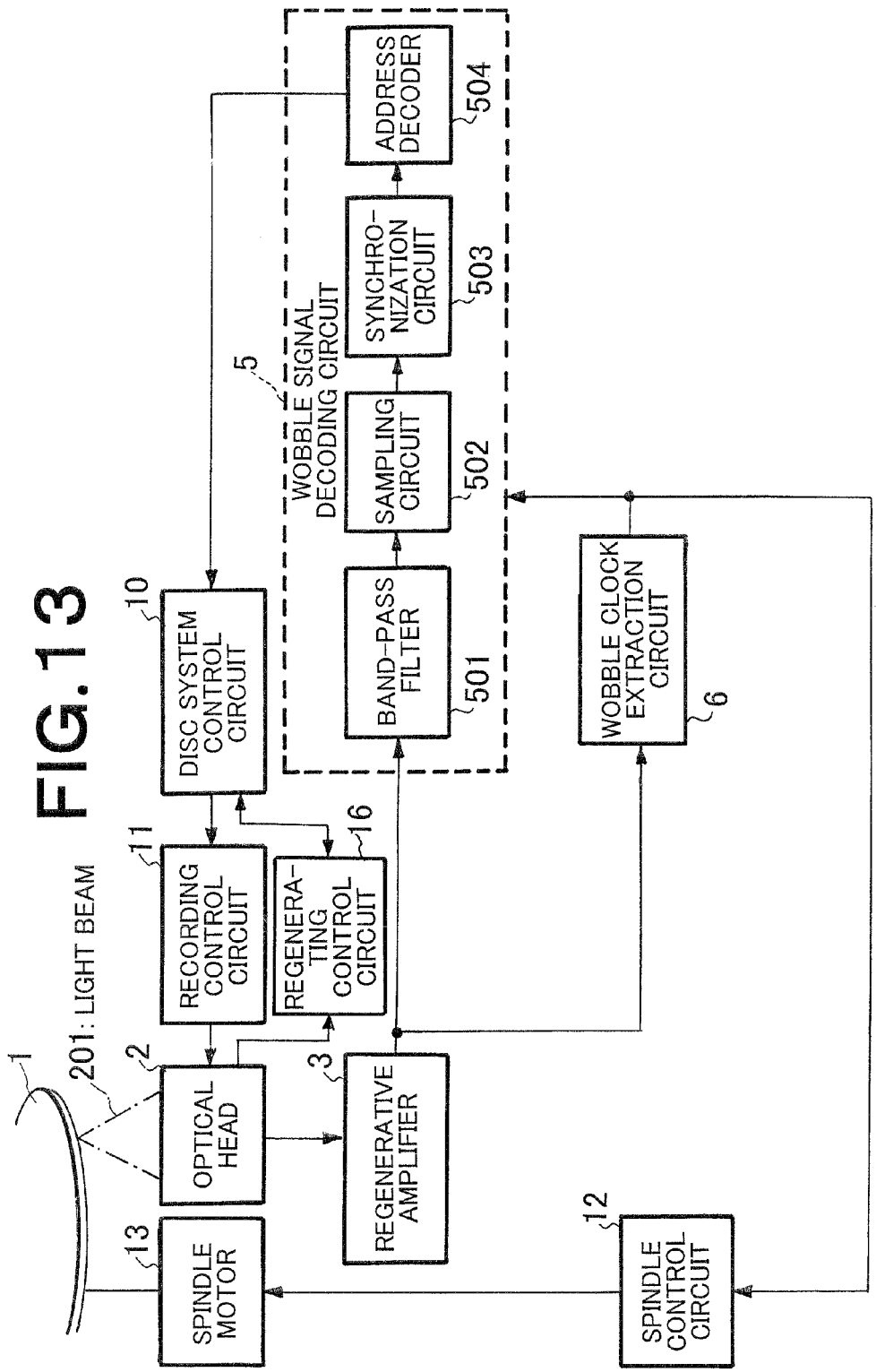
FIG. 13 is a block diagram of an optical disc apparatus of related art.

The correction of crosstalk also acts effectively when it is applied to an apparatus for reproducing the information pattern recorded to the optical disc. FIG. 12 shows an arrangement view when the correction of crosstalk is applied to an optical disc reproducing apparatus. It is needless to say that correction of crosstalk can be also applied to a recording and reproducing apparatus capable of carrying out recording and reproducing an optical disk as shown in FIG. 13. Since the signal passed through the crosstalk correction circuit 4 is output after the crosstalk component of adjacent tracks included in the signal is cancelled, the accuracy of an address detected by the wobble signal decoding circuit 5 is improved. This advantage more prominently appears in a disc having narrow track intervals and a lot of crosstalk components and in a disc having a lot of scratches and stains. Further, when reproducing processing is carried out at a high speed, an address recognition error can be reduced. The regenerating control circuit 16 detects the total amount of the light reflected from the optical disc by the current output the photodetector output from the optical head 2, and thereby an information pattern on the disc is read. In a reproducing apparatus employing the above arrangement, since the address information applied to the disc system control circuit 10 has a less amount of error, data recorded to a target address can be promptly read.

Note that it is apparent that the present invention is by no means limited to the above embodiments and that the above embodiments can be appropriately modified within the scope of the technical ideas of the present invention.

There is shown here only the example for estimating a crosstalk component in, for example, a format in which the meandering phase of the track has a region inverted to the carrier signal in the inside of the modulated portion on the basis of the signals obtained from the region having the approximately same phase as the phase of the carrier signal and from the region having the inverted phase to the phase of the carrier signal. However, a mixed crosstalk component can be also estimated by extracting the phase and amplitude of a specific component obtained by meandering phases of 120° and 240° to the carrier signal in a format in which, for example, a modulated portion is modulated to have the meandering phases of 120° and 240° to the carrier signal.

Further, a crosstalk component can be estimated likewise by extracting the phases and amplitudes specific to a non-modulated portion and a modulated portion to the frequency component in the vicinity of the carrier signal in a format modulated such that a modulated portion has the same phase as the phase of the carrier signal and only the meandering amplitude thereof is reduced to one half and in a format in which the frequency of a modulated portion is composed of a sine wave having twice the frequency of the carrier signal.

The wobble signal processing of the optical disc apparatus described above can be realized by causing a computer to execute a program. Accordingly, the present invention relates to a program, a program product, and a recording medium on which a program is record and which can be used by a computer.

Figure 15:
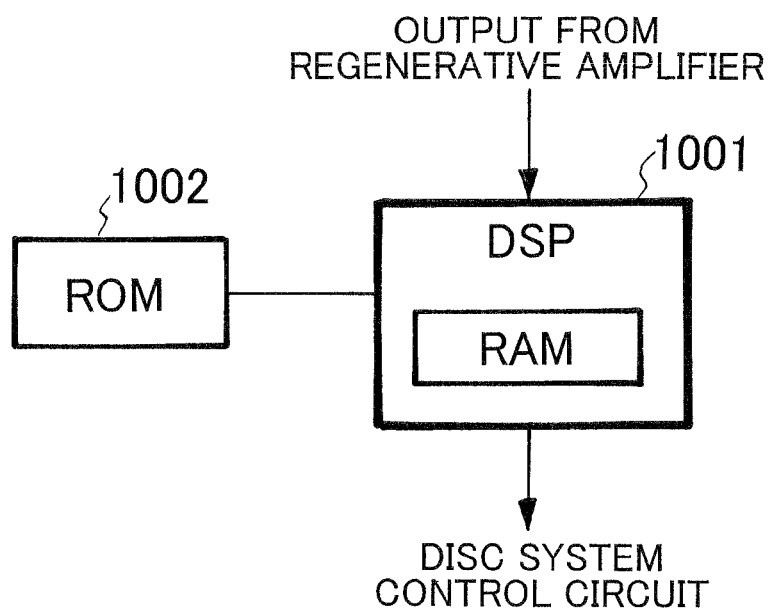
FIG. 15 is a block diagram showing an arrangement example of a computer.

Specifically, a part or all of the functions of the respective components except the spindle motor 13 and the optical head 2 can be executed by the program. FIG. 15 shows an arrangement in which the computer executes the functions of the crosstalk correction circuit 4, the carrier component extraction circuit 7, the modulation component extraction circuit 8, the crosstalk estimation circuit 9, and the wobble signal decoding circuit 5. In FIG. 15, the computer is composed of a DSP (Digital Signal Processor) 1001, which acts as an arithmetic operation processing unit, and a ROM 1002. A program, in which the functions of the crosstalk correction circuit 4, the carrier component extraction circuit 7, the modulation component extraction circuit 8, the crosstalk estimation circuit 9, and the wobble signal decoding circuit 5 are described, is stored in a semiconductor memory such as the ROM 1002 and the like. The DSP (Digital Signal Processor) 1001 acting as the arithmetic operation processing unit executes an arithmetic operation processing according to the program stored to the ROM 1002, thereby a wobble signal processing can be realized. The DSP 1001 has a RAM for storing data necessary to the arithmetic operation processing therein. A ROM, a flash memory, and the like for storing the program are exemplified as the recording medium according to the present invention.

The arrangements and the operations of the preferable embodiments of the wobble signal processing method, the recording or reproducing method, the optical disc apparatus, the program, and the recording medium according to the present invention are described above in detail. However, it should be noted that these embodiments show only examples of the present invention and does not restrict the present invention. The person skilled in the art can easily understood that the present invention can be variously modified according to specific applications without departing from the subject matter of the present invention.

The invention claimed is:

1. A wobble signal processing method used when;

a light beam is irradiated onto a track of an optical disc, which has tracks formed thereon to record information spirally, formed such that the track meanders according to a wobble signal modulated to express digital information including address information by locally inserting a signal, which is different from an approximately sine wave carrier signal having a predetermined frequency, into the carrier signal according to a predetermined pattern, an original wobble signal, which includes a component corresponding to the meandering of the track and a crosstalk component caused by the meandering of adjacent tracks, is created from reflected light, and address information and timing are detected based on the original wobble signal and an information pattern is recorded on the track or an information pattern on the track is reproduced, said method comprising:

a step of estimating the amplitude and phase of a crosstalk component mixed from the adjacent tracks based on the amplitude and phase of the original wobble signal created in a region in which the track meanders according to the carrier signal and on the amplitude and phase of the original wobble signal created in a region in which the track meanders according to the inserted signal;

a step of obtaining a reproduced wobble signal for obtaining the address information and the estimated value of the carrier signal by subtracting the estimated value of the crosstalk component from the original wobble signal; and a step of detecting the address information and the timing from the reproduced wobble signal.

2. A wobble signal processing method according to claim 1, wherein the step of estimating the amplitude and phase of the crosstalk component comprises:

a step of creating a tentative crosstalk component as an initial value;

a step of detecting the phase and amplitude in the region meandering according to the carrier signal by using the reproduced wobble signal obtained by subtracting the tentative crosstalk component from the original wobble signal using the estimated phase of the carrier signal as a standard;

a step of detecting the phase and amplitude specific to a region meandering based on the inserted signal from the reproduced wobble signal by using the estimated phase of the carrier signal as a standard;

a step of estimating a crosstalk component remaining in the reproduced wobble signal based on the phase and amplitude in the region meandering according to the carrier signal and on the phase and amplitude specific to the region meandering based on the inserted signal; and a step of updating the tentative crosstalk component so as to cancel the estimated crosstalk remaining component based on the estimated crosstalk remaining component, wherein the estimated value of the amplitude and phase of the crosstalk component is obtained by causing the tentative crosstalk component to gradually approach the crosstalk component mixed with the original wobble signal.

3. A wobble signal processing method according to claim 2, wherein the step of detecting the phase and amplitude specific to the region, which meanders based on the inserted signal, from the reproduced wobble signal estimates the specific phase and amplitude based on a value sampled using the estimated phase of the carrier signal as a standard.

4. A wobble signal processing method according to claim 2, wherein the step of detecting the phase and amplitude specific to the region, which meanders based on the inserted signal, from the reproduced wobble signal, comprises:

a step of estimating an in-phase component and orthogonal component from the reproduced wobble signal by synchronously detecting by an approximate sine wave having the same phase as the estimated phase of the carrier signal and an approximate sine wave having a phase difference of approximate 90°; and a step of estimating the specific phase and amplitude based on the estimated in-phase component and orthogonal component.

5. A wobble signal processing method according to claim 1, wherein a signal different from the carrier signal, which inserted into the carrier signal, includes at least one cycle of an approximate sine wave signal whose amplitude is approximately the same as that of the carrier signal and whose phase is approximately inverted.

6. A wobble signal processing method according to claim 5, wherein the step of detecting the phase and amplitude specific to the region, which meanders based on the signal different from the carrier signal, from the reproduced wobble signal detects the phase and amplitude by averaging the maximum values of a component showing a phase approximately inverted to the estimated phase on the basis of the estimated phase of the carrier signal.

7. An optical disc recording method using the wobble signal processing method according to claim 1, wherein an information pattern is recorded on the track by controlling the rotation speed of the optical disc referring to the frequency or phase of a carrier signal estimated based on the reproduced wobble signal.

8. An optical disc reproducing method using the wobble signal processing method according to claim 1, wherein an information pattern on the track is reproduced by controlling the rotation speed of the optical disc referring to the frequency or phase of a carrier signal estimated based on the reproduced wobble signal.

9. An optical disc recording method using the wobble signal processing method according to claim 1, comprising a step of creating a recording clock synchronized with the reproduced wobble signal based on the reproduced wobble signal, wherein the position of a light beam irradiated onto the track is controlled based on detected address information, and an information pattern is recorded to a predetermined position of the optical disc in synchronism with the recording clock.

10. A wobble signal processing method comprising:
a step of creating an original wobble signal which changes according to the meandering of one groove formed to an optical disc, on the basis of the difference of current outputs obtained from a photodetector divided into two portions in a direction along the one groove;
a step of outputting a correction signal whose crosstalk component is reduced based on an original wobble signal including the crosstalk and a estimated crosstalk component from estimated adjacent tracks;
a step of extracting a wobble clock, which is synchronized with the correction signal from the correction signal,
a step of extracting a carrier component which agrees with the phase of the wobble clock from the correction signal based on the phase of the wobble clock;
a step of extracting a modulation component from the correction signal based on the phase of the wobble clock;
a step of creating the estimated crosstalk component based on the carrier component and on the modulation component; and
a step of creating an address signal by decoding a wobble signal from the correction signal.

11. An optical disc apparatus for recording an information pattern on a tracks or reproducing an information pattern on a track by using an optical disc, which has tracks formed thereon to record information spirally, formed such that the track meanders according to a wobble signal modulated to express digital information including address information by locally inserting a signal, which is different from an approximately sine wave carrier signal having a predetermined frequency, into the carrier signal according to a predetermined pattern, said optical disc apparatus comprising:
original wobble signal reproducing means for irradiating a light beam onto the track and creating an original wobble signal including a component corresponding to the meandering of the track and a crosstalk component caused by the meandering of adjacent tracks from reflected light;
crosstalk estimation means for creating the estimated value of a crosstalk component estimated based on the original wobble signal;
crosstalk correction means for obtaining a reproduced wobble signal by subtracting the estimated value of the crosstalk component from the original wobble signal; and
wobble signal decoding means for detecting digital information including the address information based on the reproduced wobble signal whose crosstalk component is corrected,
wherein an information pattern is recorded on the track or an information pattern on the track is reproduced based on the address information and timing detected by the wobble signal decoding means.

12. An optical disc apparatus according to claim 11, wherein the crosstalk estimation means comprises:
means for holding a tentative crosstalk estimated value;
carrier component extraction means for detecting the phase and amplitude in a region meandering according to the carrier signal from the reproduced wobble signal by using the estimated phase of the carrier signal as a standard; and
modulation component extraction means for detecting a phase and amplitude specific to the region, which meandering based on the inserted signal, from the reproduced wobble signal by using the estimated phase of the carrier signal as a standard,
wherein a crosstalk component remaining in the reproduced wobble signal is estimated based on the phase and amplitude of the carrier component extracted in the region meandering according to the carrier signal and on the phase and amplitude of the modulation component specific to the region meandering based on the inserted signal, and the tentative crosstalk estimated value is updated so as to cancel the crosstalk remaining component based on the crosstalk remaining component.

13. An optical disc apparatus according to claim 12, wherein the modulation component extraction means for detecting the phase and amplitude specific to the region meandering based on the inserted signal from the reproduced wobble signal estimates the specific phase and amplitude based on a sampling value of the original wobble signal using the estimated phase of the carrier signal as standard.

14. An optical disc apparatus according to claim 12, wherein the modulation component extraction means for detecting the phase and amplitude specific to the region, which meanders based on the inserted signal, from the reproduced wobble signal comprises:
means for estimating an in-phase component and orthogonal component from the reproduced wobble signal by synchronously detecting them by an approximate sine wave having the same phase as the estimated phase of the carrier signal and an approximate sine wave having a phase difference of approximate 90°; and
means for estimating the specific phase and amplitude based on the estimated in-phase component and orthogonal component.

15. An optical disc apparatus according to claim 11, wherein a signal different from the carrier signal inserted into the carrier signal includes at least one cycle of an approximate sine wave signal whose amplitude is approximately the same as that of the carrier signal and whose phase is approximately inverted.

16. An optical disc apparatus according to claim 15, wherein modulation component extraction means for detecting the phase and amplitude specific to the region, which meanders based on the signal different from the carrier signal, from the reproduced wobble signal detects the phase and amplitude by averaging the maximum values of a component showing a phase approximately inverted to the estimated phase based on the estimated phase of the carrier signal.

17. An optical disc apparatus according to claim 11, comprising disc drive means for rotating the optical disc,
wherein the disc drive means controls the number of rotation referring to the frequency or phase of the carrier signal estimated by the carrier synchronization means.

18. An optical disc apparatus according to claim 11, further comprising means for creating a recording clock synchronized with the reproduced wobble signal based on the reproduced wobble signal,
wherein information pattern is recorded to a predetermined position of the optical disc in synchronism with the recording clock referring to the address information detected by the wobble signal decoding means.

19. An optical disc apparatus comprising:
a regenerative amplifier for outputting an original wobble signal which changes according to the meandering of one groove formed to an optical disc based on the difference of current outputs obtained from a photodetector divided into two portions in a direction along the one groove;
a crosstalk correction circuit for outputting a correction signal whose crosstalk component is reduced based on an output including the crosstalk of the regenerative amplifier and on a estimated crosstalk component from estimated adjacent tracks;

a wobble clock extraction circuit for extracting a wobble clock, which is synchronized with the correction signal from the crosstalk correction circuit, from the correction signal;

a carrier component extraction circuit for extracting a carrier component, which agrees with the phase of the wobble clock, from the correction signal of the crosstalk correction circuit based on the phase of the wobble clock;

a modulation component extraction circuit for extracting a modulation component from the output of the crosstalk correction circuit based on the phase of the wobble clock;

a crosstalk estimation circuit for outputting the estimated crosstalk based on the outputs from the carrier component extraction circuit and the modulation component extraction circuit; and a wobble signal decoding circuit for outputting an address signal by decoding a wobble signal from the crosstalk correction circuit.

20. A computer readable medium encoded with a program for causing a computer to carrying out a wobble signal processing used when; a light beam is irradiated onto a track of an optical disc, which has tracks formed thereon to record information spirally, formed such that the track meanders according to a wobble signal modulated to express digital information including address information by locally inserting a signal, which is different from an approximately sine wave carrier signal having a predetermined frequency, into the carrier signal according to a predetermined pattern, an original wobble signal, which includes a component corresponding to the meandering of the track and a crosstalk component caused by the meandering of adjacent tracks, is created from reflected light, and address information and timing are detected based on the original wobble signal and an information pattern is recorded on the track or an information pattern on the track is reproduced, said program comprising, a step of estimating the amplitude and phase of a crosstalk component mixed from the adjacent tracks based on the amplitude and phase of the original wobble signal created in a region in which the track meanders according to the carrier signal and on the amplitude and phase of the original wobble signal created in a region in which the track meanders according to the inserted signal; and a step of obtaining a reproduced wobble signal for obtaining the address information and the estimated value of the carrier signal by subtracting the estimated value of the crosstalk component from the original wobble signal, and using the reproduced wobble signal to detect the address information and timing.

21. A computer readable medium encoded with a program for causing a computer to execute a processing comprising: a step of creating an original wobble signal which changes according to the meandering of one groove formed to an optical disc, on the basis of the difference of current outputs obtained from a photodetector divided into two portions in a direction along the one groove; a step of outputting a correction signal whose crosstalk component is reduced based on an original wobble signal including the crosstalk and a estimated crosstalk component from estimated adjacent tracks; a step of extracting a wobble clock synchronized with the correction signal therefrom; a step of extracting a carrier component which agrees with the phase of the wobble clock from the correction signal based on the phase the wobble clock; a step of extracting a modulation component from the correction signal based on the phase of the wobble clock; a step of creating the estimated crosstalk component based on the carrier component and the modulation component; and a step of creating an address signal by decoding a wobble signal from the correction signal.

* * * * *